United States Patent
Larsson et al.

(10) Patent No.: US 12,321,752 B2
(45) Date of Patent: Jun. 3, 2025

(54) FREEDOM FROM INTERFERENCE USING CONTAINERS

(71) Applicant: Red Hat, Inc., Raleigh, NC (US)

(72) Inventors: Alexander Larsson, Stockholm (SE); Pierre-Yves Chibon, Puteaux (FR); Daniel Walsh, Augusta, GA (US)

(73) Assignee: Red Hat, Inc., Raleigh, NC (US)

( * ) Notice: Subject to any disclaimer, the term of this patent is extended or adjusted under 35 U.S.C. 154(b) by 70 days.

(21) Appl. No.: 18/193,792

(22) Filed: Mar. 31, 2023

(65) Prior Publication Data
US 2024/0330003 A1    Oct. 3, 2024

(51) Int. Cl.
*G06F 9/4401* (2018.01)
*G06F 9/445* (2018.01)

(52) U.S. Cl.
CPC .......... *G06F 9/4401* (2013.01); *G06F 9/4406* (2013.01); *G06F 9/445* (2013.01); *G06F 9/44505* (2013.01)

(58) Field of Classification Search
CPC ...... G06F 9/4401; G06F 9/4406; G06F 9/445; G06F 9/44505
See application file for complete search history.

(56) References Cited

U.S. PATENT DOCUMENTS

| | | | |
|---|---|---|---|
| 11,314,541 B2 * | 4/2022 | Singh | G06F 9/5055 |
| 2018/0357068 A1 * | 12/2018 | Ambichl | G06F 9/545 |
| 2019/0273655 A1 * | 9/2019 | Jones | H04L 41/0886 |
| 2020/0298870 A1 | 9/2020 | Davidovich et al. | |
| 2021/0073035 A1 | 3/2021 | Duluk et al. | |
| 2022/0197680 A1 * | 6/2022 | Rajadeva | G06F 16/116 |

FOREIGN PATENT DOCUMENTS

| | | |
|---|---|---|
| DE | 102019216226 A1 | 4/2021 |
| WO | 2020179344 A1 | 9/2020 |

OTHER PUBLICATIONS

Edge, Jake, "Systemd lightweight containers," LWN.net, https://lwn.net/Articles/536033, Feb. 6, 2031, 4 pages.
Larsson, Alexander, "GitLab Sample Automotive Applications," GitLab, https://gitlab.com/alexlarsson/sample-images/-/tree/qm-play/sample-apps, Apr. 2022, 2 pages.

(Continued)

*Primary Examiner* — Glenn A. Auve
(74) *Attorney, Agent, or Firm* — Dority & Manning, P.A.

(57) ABSTRACT

A computing device executing a kernel-based operating system, during a boot process of the operating system, can start a first system and service manager that is configured to start processes from unit files stored in a predetermined directory on a first root volume. The computing device can start, by the first system and service manager, a process from a first unit file that causes generation of a first restricted container environment that includes a second system and service manager, and a second root volume can be mounted to the first restricted container environment. The computing device can start, by the second system and service manager, a process from a second unit file stored in a predetermined directory on the second root volume and the process can execute inside the first restricted container environment.

20 Claims, 12 Drawing Sheets

(56) References Cited

OTHER PUBLICATIONS

Larsson, Alexander, "GitLab Sample Images," GitLab, https://gitlab.com/alexlarsson/sample-images/-/tree/qm-play, Dec. 2022, 1 page.

Author Unknown, "Automotive SIG documentation—Containers in automotive images," https://sigs.centos.org/automotive/building/containers/, downloaded on Mar. 13, 2023, 3 pages.

Author Unknown, "How to run systemd in a container," RedHat.com, https://developers.redhat.com/plog/2019/04/24/how-to-run-systemd-in-a-container, Apr. 24, 2019, 10 pages.

Author Unknown, "Freedom From Memory Interference—How Safe and Secure Are Current Defences?", tasking. com, https://resources.tasking.com/sites/default/files/2021-02/TASKING-Whitepaper-Freedom-from-Interference-Pt-1_WEB.pdf, 2021, 9 pages.

Author Unknown, "Automotive SIG documentation," https://sigs.centos.org/automotive, downloaded on Mar. 13, 2023, 3 pages.

\* cited by examiner

FREEDOM FROM INTERFERENCE USING CONTAINERS

BACKGROUND

In computing systems, critical applications running in the computing system cannot be interfered with by less critical applications running in the computing system. Such freedom from interference between two or more applications or other parts of the computing system is necessary in computing systems that require functional safety because failure of a critical application can cause a risk of injury or damage to those using the computing system. Thus, critical applications and less critical applications of the computing system should be free from interference in order to prevent such failures.

SUMMARY

The examples disclosed herein implement service and system managers of a kernel-based operating system for freedom from interference using containers. In particular, during a boot process of the kernel-based operating system, a first system and service manager, which can start processes from unit files stored in a directory on a first root volume, can be started. The first system and service manager can start a process from one of the unit files in the directory on the first volume, which causes the generation of a restricted container environment that contains a second system and service manager, which can start processes from unit files stored in a directory on a second root volume. The second system and service manager can start a process from one of the unit files in the directory on the second root volume inside the restricted container environment. As a result, freedom from interference can be attained because the process running in the restricted container environment cannot interfere with processes running outside the restricted container environment.

In one example, a method for freedom from interference using containers is provided. The method includes starting, by a computing device executing a kernel-based operating system during a boot process of the operating system, a first system and service manager for the kernel-based operating system, the first system and service manager configured to start a process from each of a plurality of unit files stored in a predetermined directory on a first root volume. The method further includes starting, by the first system and service manager, a process from a first unit file of the plurality of unit files that causes generation of a first restricted container environment, wherein a second root volume is mounted to the first restricted container environment, the first restricted container environment including a second system and service manager. The method further includes starting, by the second system and service manager, a process from a second unit file stored in a predetermined directory on the second root volume, the process executing inside the first restricted container environment.

In another example, a computing device executing a kernel-based operating system for freedom from interference using containers is provided. The computing device includes a memory and a processor device coupled to the memory. The processor device is to start, during a boot process of the kernel-based operating system, a first system and service manager for the kernel-based operating system, the first system and service manager configured to start a process from each of a plurality of unit files stored in a predetermined directory on a first root volume. The processor device is further to start, by the first system and service manager, a process from a first unit file of the plurality of unit files that causes generation of a first restricted container environment, wherein a second root volume is mounted to the first restricted container environment, the first restricted container environment including a second system and service manager. The processor device is further to start, by the second system and service manager, a process from a second unit file stored in a predetermined directory on the second root volume, the process executing inside the first restricted container environment.

In another example, a non-transitory computer-readable storage medium is provided. The non-transitory computer-readable storage medium includes computer-executable instructions to cause a processor device to [start, during a boot process of a kernel-based operating system, a first system and service manager for the kernel-based operating system, the first system and service manager configured to start a process from each of a plurality of unit files stored in a predetermined directory on a first root volume. The instructions further cause the processor device to start, by the first system and service manager, a process from a first unit file of the plurality of unit files that causes generation of a first restricted container environment, wherein a second root volume is mounted to the first restricted container environment, the first restricted container environment including a second system and service manager. The instructions further cause the processor device to start, by the second system and service manager, a process from a second unit file stored in a predetermined directory on the second root volume, the process executing inside the first restricted container environment.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
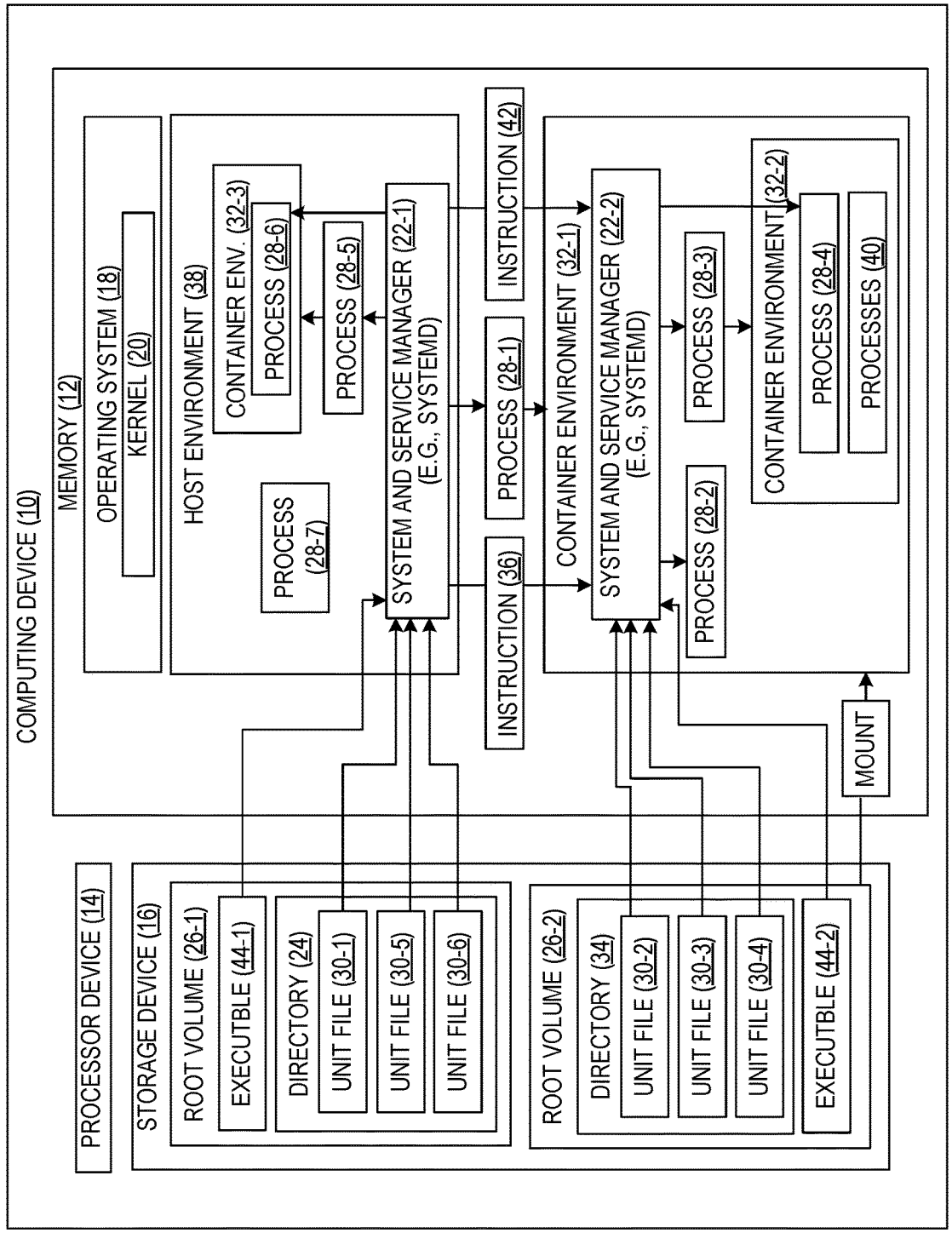
FIG. 1 is a block diagram of a computing device in which examples of freedom from interference using containers may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the elements unless otherwise explicitly specified. The word "or" as used herein and in the claims is inclusive unless contextually impossible. As an example, the recitation of A or B means A, or B, or both A and B. The word "data" may be used herein in the singular or plural depending on the context. The phrase "container" as used herein refers to Linux containers wherein the Linux kernel uses namespaces to isolate processes from one another.

In computing systems that require functional safety, critical applications running in the computing system cannot be interfered with by less critical applications running in the computing system. If both critical applications and less critical applications run on the same computing system and the critical application needs more resources at the expense of a less critical application, then the critical application should be guaranteed to get the resources. Such freedom from interference between two or more applications or other parts of the computing system is necessary in computing systems that require functional safety because failure of a critical application can cause a risk of injury or damage to those using the computing system. Thus, critical applications and less critical applications of the computing system should be isolated and free from interference in order to prevent such failures.

In order to separate critical applications from less critical applications in the same computing system, a computing system can be split into two partitions, one partition containing critical applications and another partition containing less critical applications, that share the kernel, which allows for increased performance while being lightweight. During the boot process of a kernel-based operating system, a first system and service manager can be started and the first system and service manager can start a process that causes the generation of a restricted container environment. The restricted container environment can contain a second system and service manager that can start processes for less critical applications of the computing system, while processes for critical applications can be started by the first system and service manager in an environment outside the restricted container environment. As a result, less critical applications running inside the restricted container environment cannot interfere with critical applications running in the environment outside the restricted container environment.

The functional safety component of a computing system may depend on automatic protection and correct operation in response to inputs or failures by implementing automatic protection or safety functions, with the goal of making the computing system free from unacceptable risks. For example, software and electronic hardware in aircrafts, medical devices, and railways have functional safety standards and certification processes. As one example, ISO 26262 is a functional safety standard for electronic systems installed in road vehicles (e.g., engine control units in automobiles) that provides for an Automotive Safety Integrity Level (ASIL) risk classification scheme to define the safety requirements that automobiles must meet in order to comply with the ISO 26262 standard. There are four ASILs, identified as ASIL-A, ASIL-B, ASIL-C, and ASIL-D, with ASIL-A being the level with the lowest safety requirements and ASIL-D being the level with the highest safety requirements. A fifth level, the Quality Management (QM) level, does not require safety assurance mechanisms. Freedom from interference can be applied to ensure that a QM level application does not interfere with an ASIL application.

For instance, ASIL-D applications running in the engine control unit (ECU) of an automobile may include airbags, anti-lock brakes, and power steering, ASIL-C applications may include cruise control, ASIL-B applications may include brake lights and cameras, and ASIL-A applications may include rear lights. QM level applications running in the ECU may include entertainment systems and applications, such as a radio, music streaming services, or video streaming services. When an automobile is being driven on the road, it is important that these ASIL applications operate correctly in order to protect passengers in the car and pedestrians. For example, when anti-lock braking needs to be employed, the anti-lock braking application must be afforded the computing resources to be quickly implemented for safety, while an interruption in a QM level application is less severe, so the QM level application should not be able to interfere with anti-lock braking application to allow the anti-lock braking to function without interruption. A computing device can use a first system and service manager to create a container environment that is restricted from other areas of the computing device, a second system and service manager in the container environment can start QM level applications inside the container environment, and the first system and service manager can start ASIL applications outside the container environment, allowing the ASIL applications to be free from interference from the QM level applications while running on the same ECU and sharing the kernel.

FIG. 1 is a block diagram of a computing device 10 that comprises a system memory 12, a processor device 14, and a storage device 16 in which examples of freedom from interference using containers may be practiced. It is to be understood that the computing device 10 in some examples may include constituent elements in addition to those illustrated in FIG. 1. In the example of FIG. 1, the computing device 10 implements a kernel-based operating system 18 with kernel 20 for freedom from interference using containers.

During a boot process of the kernel-based operating system 18, a first system and service manager 22-1 for the kernel-based operating system 18 can be started. For instance, the boot process of the kernel-based operating system 18 may start with a basic input/output system (BIOS) performing start up tasks, performing integrity checks, and loading and executing a boot loader. The execution of the boot loader can include loading the kernel 20 of the kernel-based operating system 18. The kernel 20 can set up components of the computing device 10, mount the root filesystem, and then separately start the init process (i.e., the initial process). The init process is the first process to start during the boot process of the kernel-based operating system 18 and may be the first system and service manager 22-1, so the first system and service manager 22-1 can be started at the time during the boot process of the kernel-based operating system 18 when the init process is started by the kernel 20. Because the init process is the first process to start, the init process is assigned PID 1 (i.e., process identifier 1). The init process can be the first system and service manager 22-1, which can be assigned PID 1 since the first system and service manager 22-1 can be the first process started. The first system and service manager 22-1 (i.e., the init process) can be systemd, a system and service manager that can manage the system, the services of the system, and the processes of the system, interface between applications and the kernel, mount filesystems, and perform other actions to manage the components of the computing device 10 running the kernel-based operating system 18 based on the Linux operating system. Systemd can start unit files that define how systemd handles a unit (e.g., a resource, such as an application or service) that corresponds to the unit file, such as starting a unit file that starts a service. The unit files that systemd can access may be found in various locations, such as in directories in the root filesystem or root volume, and can contain instructions on how systemd can start or manage a resource, such as instructions for starting a particular service.

For instance, the first system and service manager 22-1 can be configured to start a process from a unit file. The unit file may be one unit file of a plurality of unit files that can be stored in a predetermined directory 24 on a first root volume 26-1 or root filesystem. The first root volume 26-1 may be a component of the storage device 16. The process that is started by the first system and service manager 22-1 from a unit file may be a single process, such as a process that runs in the background, one of the processes that runs an application or software, or more than one process of an application or software as non-limiting examples. For instance, starting a process from a unit file can refer to starting an application.

The first system and service manager 22-1 can start a process 28-1 from a first unit file 30-1 of the plurality of unit files. Starting the process 28-1 from the first unit file 30-1 can cause the generation of a first restricted container environment 32-1. The first restricted container environment 32-1 can be a container, where processes inside the container are isolated from processes outside the container. A second root volume 26-2 or root filesystem can be mounted to the first restricted container environment 32-1. The second root volume 26-2 may be a component of the storage device 16.

For example, the first unit file 30-1 can have commands for a container engine, such as Podman, to initialize and start a container (e.g., the first restricted container environment 32-1). Initializing the container (e.g., the first restricted container environment 32-1) can include mounting filesystems (e.g., the second root volume 26-2), then the container can start running and processes can be started inside the container. Because the first system and service manager 22-1 can start the process 28-1 that causes the first restricted container environment 32-1 to be generated from the first unit file 30-1, such as with Podman commands in the first unit file 30-1 that initialize and start the first restricted container environment 32-1, and the first system and service manager 22-1 executes during the boot process, the generation of the first restricted container environment 32-1 can occur during the boot process.

The first restricted container environment 32-1 can include a second system and service manager 22-2. The second system and service manager 22-2 (i.e., the init process) can be systemd. For instance, the second system and service manager 22-2 can be a second systemd with identical functionality to the first system and service manager 22-1 in implementations where the first system and service manager 22-1 is a first systemd. The second system and service manager 22-2 can be configured to start a process from a unit file. The unit file may be one unit file of a plurality of unit files that can be stored in a predetermined directory 34 on a second root volume 26-2 or root filesystem. The second system and service manager 22-2 can start a process 28-2 from a second unit file 30-2 of the plurality of unit files. The second unit file 30-2 can be stored in the predetermined directory 34 on the second root volume 26-2. Because the second root volume 26-2 was mounted to the first restricted container environment 32-1, the second system and service manager 22-2 can access unit files on the second root volume 26-2. The second system and service manager 22-2 cannot access unit files in the first root volume 26-1 because the first root volume 26-1 has not been mounted to the first restricted container environment 32-1. The process 28-2 started by the second system and service manager 22-2 can execute inside the first restricted container environment 32-1.

As a result, processes running inside the first restricted container environment 32-1 cannot interfere with processes running outside the first restricted container environment 32-1. For instance, the process 28-2 cannot interfere with any processes running outside the first restricted container environment 32-1, such as the process 28-1. The process 28-1 or the process 28-2, which cannot interfere with each other, may be processes, services, or applications, as non-limiting examples. This freedom from interference can be applied to applications where functional safety requirements need to be achieved for a computing system, such as in the ASIL risk classification scheme that defines the safety requirements for automobiles to comply with the ISO 26262 standard. For example, the computing device 10 may be in an automobile and the process 28-1 may be an ASIL-D application and the process 28-2 may be a QM level application. The first root volume 26-1 may contain unit files that correspond to ASIL applications, and the second root volume may contain unit files that correspond to QM level applications. Because the QM level application (i.e., process 28-2) is running inside the first restricted container environment 32-1 and was started by the second system and service manager 22-2 in the first restricted container environment 32-1 with access only to the second root volume 26-2, the QM level application cannot interfere with the ASIL-D application (i.e., process 28-1). This freedom from interference can be applied to functions where critical applications must be free from interference from less critical applications of a computing system, as well as in other functional safety areas in addition to the automotive area.

The first system and service manager 22-1 may utilize an executable 44-1 on the first root volume 26-1 and the second system and service manager 22-2 may utilize an executable 44-2 on the second root volume 26-2. In some examples, the executable 44-2 may have the same contents as the executable 44-1 and the executables reside on the second root volume 26-2 and the first root volume 26-1, respectively.

In some implementations, the second system and service manager 22-2 can start the process 28-2 from the second unit file 30-2 by the first system and service manager 22-1 instructing the second system and service manager 22-2 to start the process 28-2 from the second unit file 30-2 inside the first restricted container environment 32-1. For example, the first system and service manager 22-1 can send an instruction 36 to the second system and service manager 22-2 that instructs the second system and service manager 22-2 to start the process 28-2 from the second unit file 30-2 inside the first restricted container environment 32-1. As a result, the process 28-2 can run inside the first restricted container environment 32-1 and be isolated from processes running outside the first restricted container environment 32-1. For example, a process (e.g., process 28-7) can be a process that initiates the installation of a less critical application (e.g., a QM level application), and the first system and service manager 22-1 can instruct the second system and service manager 22-2 in the first restricted container environment 32-1 to start installing the less critical application in the first restricted container environment 32-1. The less critical application can be isolated from processes running outside the first restricted container environment 32-1 (e.g., process 28-1, process 28-7, critical applications), so the less critical application cannot interfere with such processes running outside the first restricted container environment 32-1.

A host environment 38 can run on the computing device 10 executing the kernel-based operating system 18. The host environment 38 can be external to the first restricted container environment 32-1 and can include the first system and service manager 22-1 and processes that are executing outside the first restricted container environment 32-1, such as process 28-7. Processes running inside the first restricted container environment 32-1 cannot interfere with processes running outside the first restricted container environment 32-1, therefore the processes running inside the first restricted container environment 32-1 (e.g., process 28-2, process 28-3) cannot interfere with processes running in the host environment 38 (e.g., process 28-5, process 28-7). For example, freedom from interference may be achieved when the host environment 38 runs critical or ASIL applications and the first restricted container environment 32-1 runs less critical or QM level applications, as the less critical applications running inside the first restricted container environment 32-1 (e.g., process 28-2) cannot interfere with the more critical applications running in the host environment 38 (e.g., process 28-7).

In another example, the second system and service manager 22-2 can start a process 28-3 from a third unit file 30-3 that may be stored in the predetermined directory 34 on the second root volume 26-2. Starting the process 28-3 from the third unit file 30-3 can cause the generation of a second restricted container environment 32-2 inside the first restricted container environment 32-1. The second system and service manager 22-2 can start a process 28-4 from a fourth unit file 30-4 stored in the predetermined directory 34 on the second root volume 26-2. The process 28-4 started by the second system and service manager 22-2 can execute inside the second restricted container environment 32-2. Additional processes 40 can be started by the second system and service manager 22-2 inside the second restricted container environment 32-2. This allows for a container with an application running inside the container (i.e., the child container) to be within another container (i.e., the parent container), providing for additional freedom from interference, as the application running inside the child container cannot interfere with any processes inside the parent container or another part of the computing system. As a result, the process 28-4 running inside the second restricted container environment 32-2 cannot interfere with processes running outside the second restricted container environment 32-2, such as processes running inside the first restricted container environment 32-1, processes running outside the containers (e.g., process 28-1), and processes running in the host environment 38 (e.g., process 28-5, process 28-7). Additionally, the processes 40 inside the second restricted container environment 32-2 can be restricted from accessing locations outside the first restricted container environment 32-1 and the second restricted container environment 32-2. Additional restricted container environments can be created using the same process, with processes or applications running inside each container, isolated from processes running outside the container and unable to interfere with the processes running outside the container.

For example, the third unit file 30-3 can have commands for a container engine, such as Podman, to initialize and start a container (e.g., the second restricted container environment 32-2) inside the first restricted container environment 32-1 when the second system and service manager 22-2 starts the process 28-3. The process 28-4 may be a less critical or QM level application. The fourth unit file 30-4 may have instructions or commands (e.g., Podman commands) to run the process 28-4 inside the second restricted container environment 32-2. The less critical or QM level application can then run inside the second restricted container environment 32-2, isolated from other applications and processes running inside the first restricted container environment 32-1 and outside the first restricted container environment 32-1. The less critical or QM level application should not be able to interfere with other QM level applications running inside other restricted container environments or more critical or ASIL applications that are running outside the first restricted container environment 32-1.

In some implementations, the second system and service manager 22-2 can start the process 28-4 from the fourth unit file 30-4 by the first system and service manager 22-1 instructing the second system and service manager 22-2 to start the process 28-4 from the fourth unit file 30-4 inside the second restricted container environment 32-2. For example, the first system and service manager 22-1 can send an instruction 42 to the second system and service manager 22-2 that instructs the second system and service manager 22-2 to start the process 28-4 from the fourth unit file 30-4 inside the second restricted container environment 32-2. As a result, the process 28-4 can run inside the second restricted container environment 32-2 and be isolated from processes running outside the second restricted container environment 32-2, such as the first restricted container environment 32-1 and the host environment 38. For example, a process from the host environment 38 (e.g., process 28-7) can be a process that initiates the installation of a less critical application (e.g., a QM level application), and the first system and service manager 22-1 can instruct the second system and service manager 22-2 in the first restricted container environment 32-1 to start installing the less critical application in the second restricted container environment 32-2. The less critical application can be isolated from processes running outside the second restricted container environment 32-2 (e.g., process 28-1, processes in the host environment 38, processes running inside the first restricted container environment 32-1, critical applications), so the less critical application cannot interfere with such processes running outside the second restricted container environment 32-2.

In some implementations, the first system and service manager 22-1 can start a process 28-5 from a fifth unit file 30-5 that may be stored in the predetermined directory 24 on the first root volume 26-1. Starting the process 28-5 from the fifth unit file 30-5 can cause the generation of a third restricted container environment 32-3 inside the host environment 38. The first system and service manager 22-1 can start a process 28-6 from a sixth unit file 30-6 that may be stored on the first root volume 26-1. The process 28-6 started by the first system and service manager 22-1 can execute inside the third restricted container environment 32-3. This allows for a container with an application running in the container (i.e., the child container) to be within another container (i.e., the parent container), providing for additional freedom from interference, as the application running inside the child container cannot interfere with any processes inside the parent container or another part of the computing system. As a result, the process 28-6 running inside the third restricted container environment 32-3 cannot interfere with processes running outside the third restricted container environment 32-3.

For example, the fifth unit file 30-5 can have commands for a container engine, such as Podman, to initialize and start a container (e.g., the third restricted container environment 32-3) inside the host environment 38 when the first system and service manager 22-1 starts the process 28-5. The process 28-6 be a critical or ASIL application. The sixth unit file 30-6 may have instructions or commands (e.g., Podman commands) to run the process 28-6 inside the third restricted container environment 32-3. The critical or ASIL application can then run inside the third restricted container environment 32-3, isolated from other applications and processes running inside the host environment 38 and outside the host environment 38. The critical or ASIL application will not be able to be interfered with by other critical or ASIL applications running in the system, the host environment 38, or another restricted container environment, or by less critical or QM level applications running inside the first restricted container environment 32-1 or another restricted container environment.

The first restricted container environment 32-1 and the second restricted container environment 32-2 may comprise any containerization technology or containerization technologies, such as, by way of non-limiting example, Open Shift, Docker, Kubernetes, or the like. While for purposes of illustration only a few container environments are illustrated, in operation, the computing device 10 may have hundreds or thousands of container environments executing at any given time. In some examples, the container environment is implemented in a cloud computing environment, such as, by way of non-limiting example, an Amazon Web Services (AWS) or Microsoft Azure cloud computing environment.

It is to be understood that, because the first system and service manager 22-1 is a component of the computing device 10, functionality implemented by the first system and service manager 22-1 may be attributed to the computing device 10 generally. Moreover, in examples where the first system and service manager 22-1 comprises software instructions that program the processor device 14 to carry out functionality discussed herein, functionality implemented by the first system and service manager 22-1 may be attributed herein to the processor device 14. It is to be further understood that while, for purposes of illustration only, the first system and service manager 22-1 is depicted as a single component, the functionality implemented by the first system and service manager 22-1 may be implemented in any number of components, and the examples discussed herein are not limited to any particular number of components.

Figure 2:
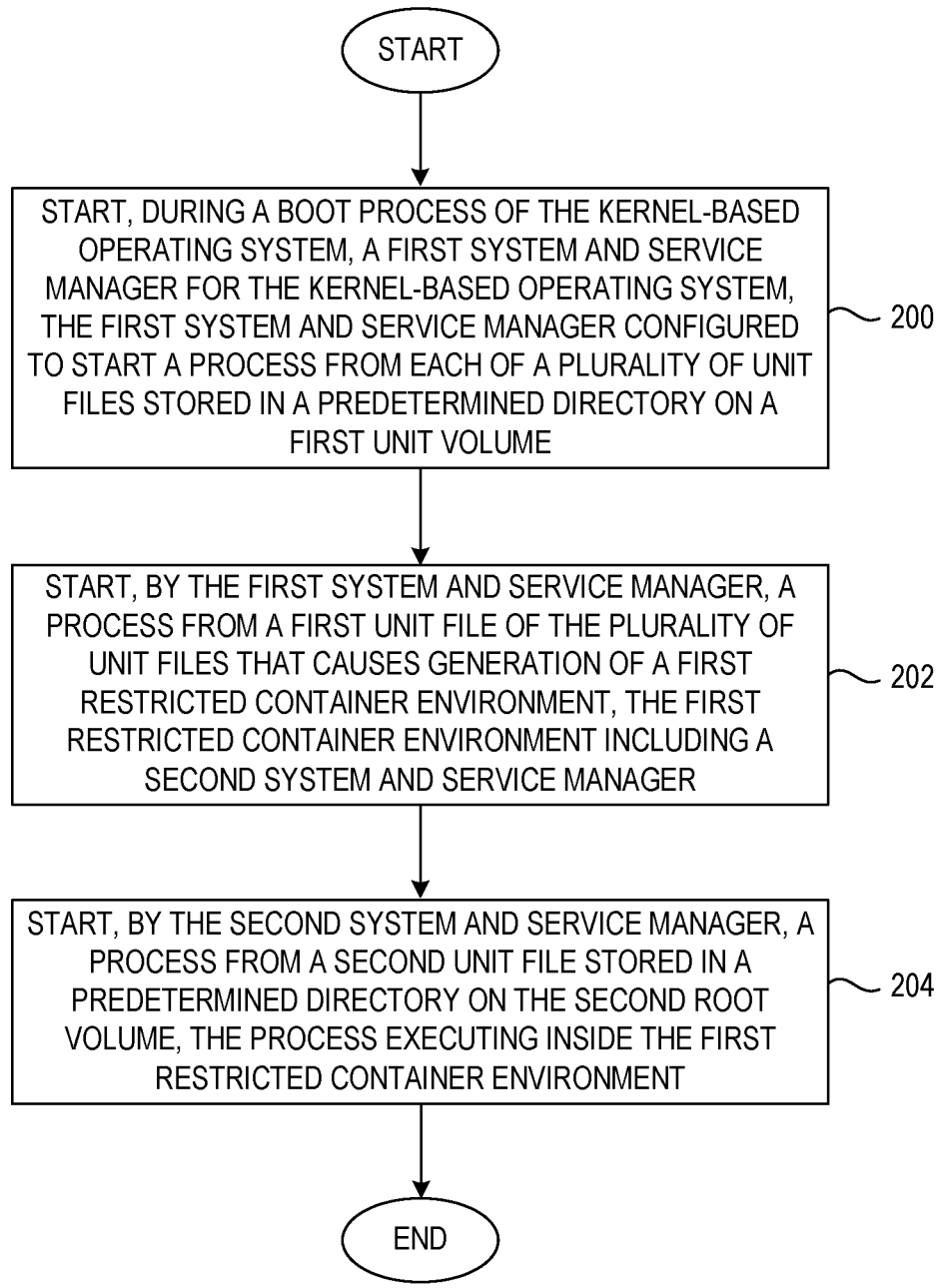
FIG. 2 is a flowchart illustrating operations performed by the computing device of FIG. 1 for freedom from interference using containers, according to one example.

FIG. 2 is a flowchart illustrating operations performed by the computing device of FIG. 1 for freedom from interference using containers, according to one example. Elements of FIG. 1 are referenced in describing FIG. 2 for the sake of clarity. In FIG. 2, operations begin with a processor device of a computing device executing a kernel-based operating system, such as the processor device 14 of the computing device 10 of FIG. 1, starting, during a boot process of the kernel-based operating system, a first system and service manager for the kernel-based operating system, the first system and service manager configured to start a process from each of a plurality of unit files stored in a predetermined directory on a first root volume (block 200). The processor device 14 then starts, by the first system and service manager, a process from a first unit file of the plurality of unit files that causes generation of a first restricted container environment, wherein a second root volume is mounted to the first restricted container environment, the first restricted container environment including a second system and service manager (block 202). The processor device 14 then starts, by the second system and service manager, a process from a second unit file stored in a predetermined directory on the second root volume, the process executing inside the first restricted container environment (block 204).

Figure 3:
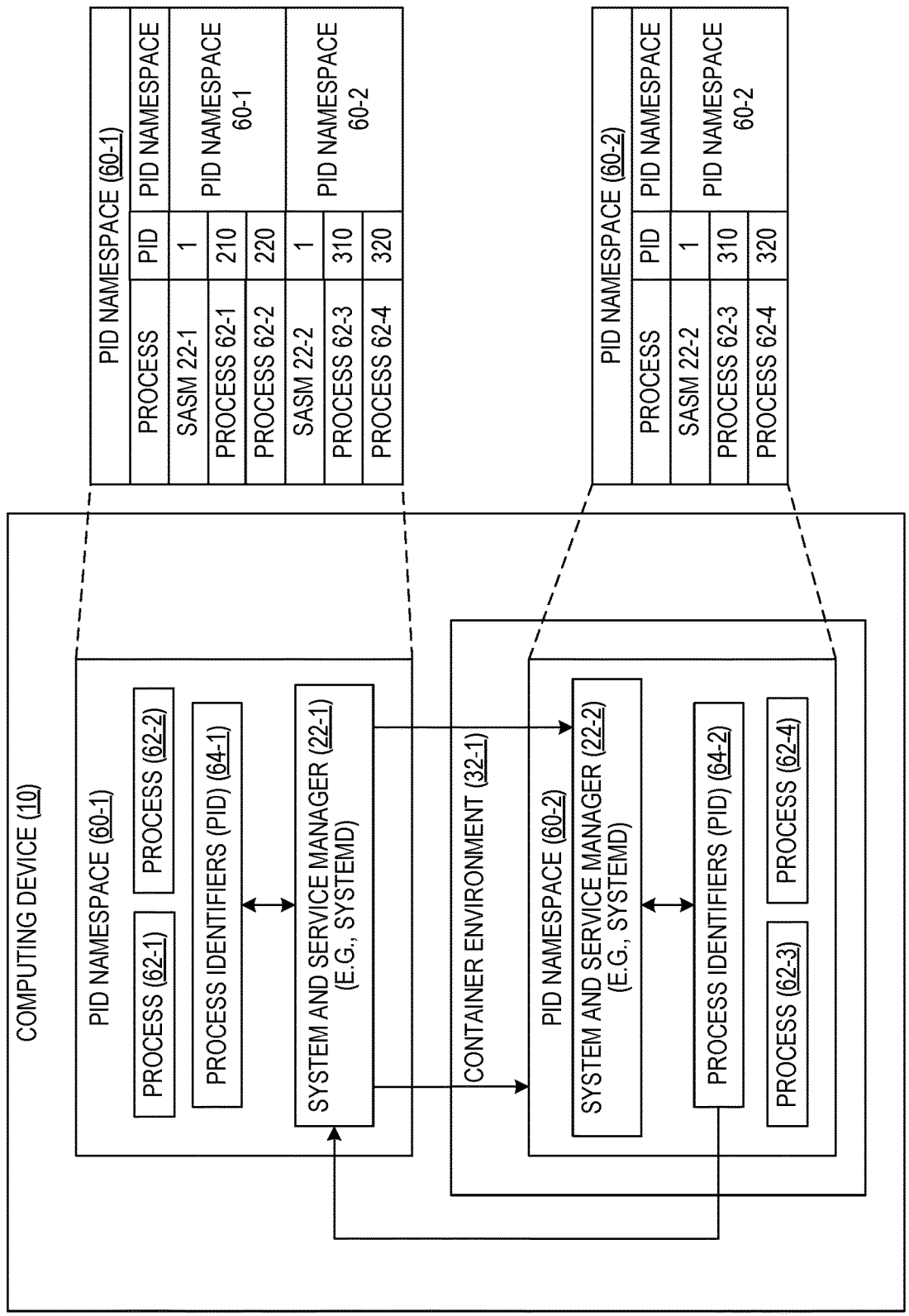
FIG. 3 is a block diagram of the computing device of FIG. 1 for freedom from interference using containers, according to one example.

FIG. 3 is a block diagram of the computing device of FIG. 1 for freedom from interference using containers, according to one example. Elements of FIG. 1 are referenced in describing FIG. 3 for the sake of clarity. In the example of FIG. 3, the computing device 10 may contain a first PID (process ID) namespace 60-1. The first PID namespace 60-1 may contain processes, such as process 62-1 and process 62-2, and the first system and service manager 22-2. Each process in the first PID namespace 60-1 can have a process identifier in a first group of process identifiers 64-1. The first system and service manager 22-1 can create a second PID (process ID) namespace 60-2 inside the first restricted container environment 32-1, such as when the first restricted container environment 32-1 is initialized and started. The first system and service manager 22-1 can start the second system and service manager 22-2 inside the second PID namespace 60-2 inside the first restricted container environment 32-1. The second PID namespace 60-2 may contain processes, such as process 62-3 and process 62-4, and the second system and service manager 22-2. Each process in the second PID namespace 60-2 can have a process identifier in a second group of process identifiers 64-2.

The PID namespaces (e.g., first PID namespace 60-1 and second PID namespace 60-2) are a feature of the Linux operating system that give each process a PID, with the initial process (e.g., systemd) being assigned PID number 1. The PID namespace can identify and obtain the processes in the PID namespace and the corresponding PIDs. There can be multiple PID namespaces in an operating system. PID namespaces can be nested, so a parent PID namespace can identify or obtain the PIDs and processes of a child PID namespace, but a child PID namespace cannot identify or obtain the PIDs and processes of the parent PID namespace.

For instance, the first system and service manager 22-1 is the init process (e.g., systemd) that started the other processes, therefore the first PID namespace 60-1, with the first system and service manager 22-1, the process 62-1, the process 62-2, and the first group of process identifiers 64-1, is the parent PID namespace. The first system and service manager 22-1 starts the process 28-1 that causes the generation of the first restricted container environment 32-1 that includes the second system and service manager 22-2 and creates the second PID namespace 60-2 inside the first restricted container environment 32-1, so the second PID namespace 60-2, with the second system and service manager 22-2, the process 62-3, the process 62-4, and the second group of process identifiers 64-2, is the child PID namespace. As a result, the first system and service manager 22-1 can obtain the first group of process identifiers 64-1 and the corresponding processes for each identifier in the first group of process identifiers 64-1 (e.g., process 62-1 and PID 210, process 62-2 and PID 220), as well as the second group of process identifiers 64-2 in the first restricted container environment 32-1 and the corresponding processes for each identifier in the second group of process identifiers 64-2 (e.g., process 62-3 and PID 310, process 62-4 and PID 320). Because the second PID namespace 60-2 is a child of the first PID namespace 60-1, the second system and service manager 22-2 cannot obtain process identifiers in PID namespaces outside the first restricted container environment 32-1, such as the first group of process identifiers 64-1 and the corresponding processes for each identifier in the first group of process identifiers 64-1 (e.g., process 62-1 and PID 210, process 62-2 and PID 220).

For example, the first system and service manager 22-1 can be the init process systemd with PID 1 and processes that the first system and service manager 22-1 (e.g., systemd) starts (e.g., process 62-1, process 62-2) can also be assigned PIDs (e.g., PID 210, PID 220). These processes (e.g., first system and service manager 22-1, process 62-1, process 62-2) and the corresponding PIDs (e.g., 1, 210, 220) can be listed in the first PID namespace 60-1. The processes (e.g., process 62-1, process 62-2) may be critical or ASIL applications. The first system and service manager 22-1 (e.g., systemd) can start a process that starts the first restricted container environment 32-1 that includes the second system and service manager 22-1 and the second PID namespace 60-2 inside the first restricted container environment 32-1. The second system and service manager 22-1 can be the init process systemd with PID 1 in the first restricted container environment 32-1 and processes that the second system and service manager 22-2 (e.g., systemd) starts in the first restricted container environment 32-1 (e.g., process 62-3, process 62-4) can also be assigned PIDs (e.g., PID 310, PID 320). These processes (e.g., second system and service manager 22-2, process 62-3, process 62-4) and the corresponding PIDs (e.g., 1, 310, 320) can be listed in the second PID namespace 60-2, as well as in the first PID namespace 60-1 since the second PID namespace 60-2 is a child of the first PID namespace 60-1. The second PID namespace 60-2 cannot also list the processes and corresponding PIDs of the first PID namespace 60-1 since the second PID namespace 60-2 is a child of the first PID namespace 60-1. The process 62-3 and the process 62-4 may be less critical or QM level applications. Because the process 62-3 and the process 62-4 are in the second PID namespace 60-2, these less critical or QM level applications can be listed in the second PID namespace 60-2 and the first PID namespace 60-1, but the critical or ASIL applications (e.g., process 62-1, process 62-2) cannot be listed in the second PID namespace 60-2, allowing the critical applications freedom from interference from the less critical applications that are unaware of the critical applications which do not appear in the second PID namespace 60-2.

Figure 4:
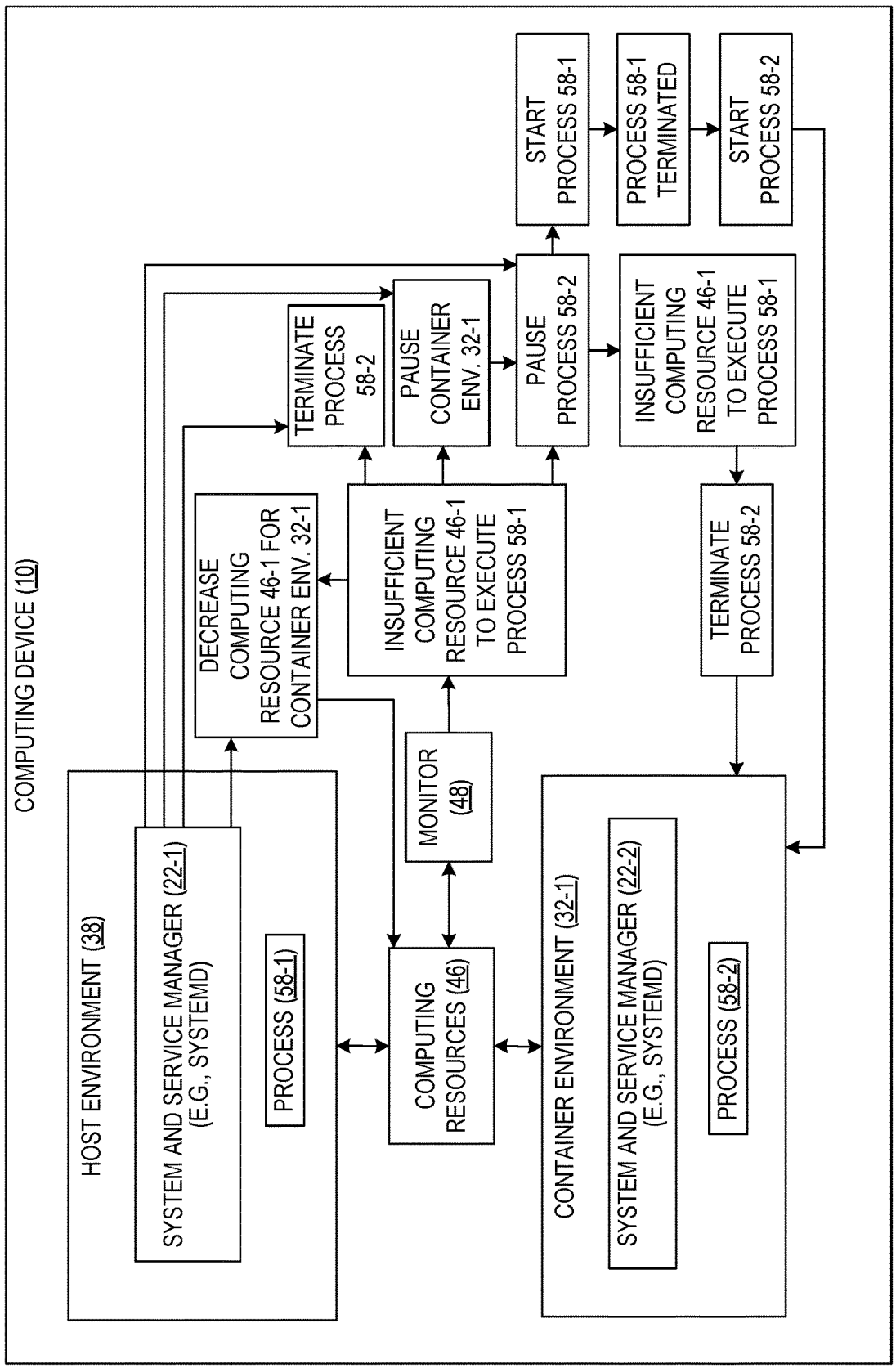
FIG. 4 is a block diagram of the computing device of FIG. 1 for freedom from interference using containers, according to one example.

FIG. 4 is a block diagram of the computing device of FIG. 1 for freedom from interference using containers, according to one example. Elements of FIG. 1 are referenced in describing FIG. 4 for the sake of clarity. In the example of FIG. 4, the computing device 10 may determine that there is an insufficient amount of a computing resource 46-1 from among a plurality of computing resources 46 in order to execute a process 58-1 in the host environment 38, where the process 58-1 is external to the first restricted container environment 32-1. The computing resources 46 may include memory, CPU load, CPU cycles, storage, battery level, and network connection, as non-limiting examples.

In one example, in response to determining that there is an insufficient amount of the computing resource 46-1, the first system and service manager 22-1 can cause a decrease in the utilization of the computing resource 46-1 by the first restricted container environment 32-1. For example, the process 58-1 may be a critical or ASIL application running in the host environment 38 and the first restricted container environment 32-1 may contain less critical or QM level applications. The computing device 10 may determine that there is not enough memory (e.g., computing resource 46-1) for the ASIL application to execute in the host environment 38, then the first system and service manager 22-1 can cause the first restricted container environment 32-1, and the QM level applications running inside the first restricted container environment 32-1, to use less memory. This change in the memory usage by the first restricted container environment 32-1 can allow the ASIL application, which may be critical to the function and safety of the computing device 10, to operate without interruption or interference from the QM level applications.

In another example, in response to determining that there is an insufficient amount of the computing resource 46-1 in order to execute the process 58-1 in the host environment 38, the first system and service manager 22-1 can cause a process in the first restricted container environment 32-1, such as process 58-2, to be paused. The process 58-1 can then be started in the host environment 38 while the process 58-2 is paused. The computing device 10 can then determine that the process 58-1 in the host environment 38 has terminated. Once the process 58-1 in the host environment 38 has terminated, the process 58-2 in the first restricted container environment 32-1 can be started. For example, the process 58-1 may be a critical or ASIL application that needs to run in the host environment 38 and the process 58-2 in the first restricted container environment 32-1 may be a less critical or QM level application. The computing device 10 may determine that there is not enough memory (e.g., computing resource 46-1) for the ASIL application to execute in the host environment 38, then the first system and service manager 22-1 can cause the QM level application in the first restricted container environment 32-1 to be paused. The computing device 10 may determine that the ASIL application now has enough memory to execute and the ASIL application can be started by the first system and service manager 22-1 in the host environment 38. The computing device 10 may then determine that the ASIL application has terminated, such as by finishing the intended operation of the application, and restart the QM level application in the first restricted container environment 32-1.

In another example, in response to determining that there is an insufficient amount of the computing resource 46-1 in order to execute the process 58-1 in the host environment 38, the first system and service manager 22-1 can cause the process 58-2 in the first restricted container environment 32-1 to be terminated. For example, the process 58-1 may be a critical or ASIL application that needs to run in the host environment 38 and the process 58-2 in the first restricted container environment 32-1 may be a less critical or QM level application. The computing device 10 may determine that there is not enough memory (e.g., computing resource 46-1) for the ASIL application to execute in the host environment 38, then the first system and service manager 22-1 can cause the QM level application in the first restricted container environment 32-1 to be terminated. The ASIL application may be an ASIL-D application that needs to execute without any interference and has priority of the computing resources due to the importance of the application for functional safety, so sharing computing resources or pausing a QM level application may not be enough to allow the ASIL-D application to execute properly. The computing device 10 can cause the first system and service manager 22-1 to terminate the QM level application in the first restricted container environment 32-1 so that the ASIL application can execute without interference. The first system and service manager 22-1 can send a message or instruct the second system and service manager 22-2 in the first restricted container environment 32-1 to terminate the QM level application, or the first system and service manager 22-1 can send a message or instruct the kernel 20 to terminate the QM level application in the first restricted container environment 32-1, as non-limiting examples of how the first system and service manager 22-1 can cause a process in the first restricted container environment 32-1 to be terminated.

In another example, in response to determining that there is an insufficient amount of the computing resource 46-1 in order to execute the process 58-1 in the host environment 38, the first system and service manager 22-1 can cause a process in the first restricted container environment 32-1, such as the process 58-2, to be paused. The computing device 10 can then determine that there is still the insufficient amount of the computing resource 46-1 in order to execute the process 58-1 in the host environment 38. For instance, after pausing the process 58-2 in the first restricted container environment 32-1, the first system and service manager 22-1 can attempt to start the process 58-1 in the host environment 38 and the process 58-1 may unsuccessfully start in the host environment 38 due to continuing to have the insufficient amount of the computing resource 46-1, or other computing resources, in order to execute the process 58-1 in the host environment 38. In response to the process 58-1 unsuccessfully starting in the host environment 38, the first system and service manager 22-1 can cause the process 58-2 in the first restricted container environment 32-1 to be terminated, such as by the first system and service manager 22-1 sending a message or instruction to the second system and service manager 22-2 in the first restricted container environment 32-1 to terminate the process 58-2, or sending a message or instruction to the kernel 20 to terminate the process 58-2, as non-limiting examples.

In another example, in response to determining that there is an insufficient amount of the computing resource 46-1 in order to execute the process 58-1 in the host environment 38, the first system and service manager 22-1 can cause the first restricted container environment 32-1 to be paused. As a result of pausing the first restricted container environment 32-1, the processes that were executing inside the first restricted container environment 32-1, such as the process 58-1, can all be paused. For example, the process 58-1 may be a critical or ASIL application that needs to run in the host environment 38 and the first restricted container environment 32-1 may contain less critical or QM level applications. The computing device 10 may determine that there is not enough memory (e.g., computing resource 46-1) for the ASIL application to execute in the host environment 38, then the first system and service manager 22-1 can cause the first restricted container environment 32-1 to be paused. The first restricted container environment 32-1 may be a process or a group of processes that the first system and service manager 22-1 can pause. When the first restricted container environment 32-1 is paused, the processes running in the first restricted container environment 32-1 (e.g., process 58-2) are paused. For instance, the ASIL application may be an ASIL-D application that needs to execute without any interference and has priority of the computing resources due to the importance of the application for functional safety, so sharing computing resources or pausing or terminating a QM level application may not be enough to allow the ASIL-D to execute properly, so the first restricted container environment 32-1 may be paused.

In another example, in response to determining that there is an insufficient amount of the computing resource 46-1 in order to execute the process 58-1 in the host environment 38, the first system and service manager 22-1 can cause the first restricted container environment 32-1 to be terminated. As a result of terminating the first restricted container environment 32-1, the processes that were executing inside the first restricted container environment 32-1, such as the process 58-1, can all be terminated.

In some implementations, a monitor 48 may determine that there is the insufficient amount of the computing resource 46-1 to execute the process 58-1 in the host environment 38, where the process 58-1 is external to the first restricted container environment 32-1. For instance, the monitor 48 may display or identify the processes running in the host environment 38, the first restricted container environment 32-1, processes running inside containers, processes running on the computing device 10, and the computing resources utilized by each process and each container. The monitor 48 can determine that the process 58-1 does not have sufficient computing resources to execute, such as by comparing the resources needed for the process 58-1 to what is available and what is used by other processes, as non-limiting examples, and may identify the process 58-1 as a critical application that takes priority in the utilization of computing resources over less critical applications. It is to be understood that, because the monitor 48 is a component of the computing device 10, functionality implemented by the monitor 48 may be attributed to the computing device 10 generally. Moreover, in examples where the monitor 48 comprises software instructions that program the processor device 14 to carry out functionality discussed herein, functionality implemented by the monitor 48 may be attributed herein to the processor device 14. It is to be further understood that while, for purposes of illustration only, the monitor 48 is depicted as a single component, the functionality implemented by the monitor 48 may be implemented in any number of components, and the examples discussed herein are not limited to any particular number of components.

Figure 5:
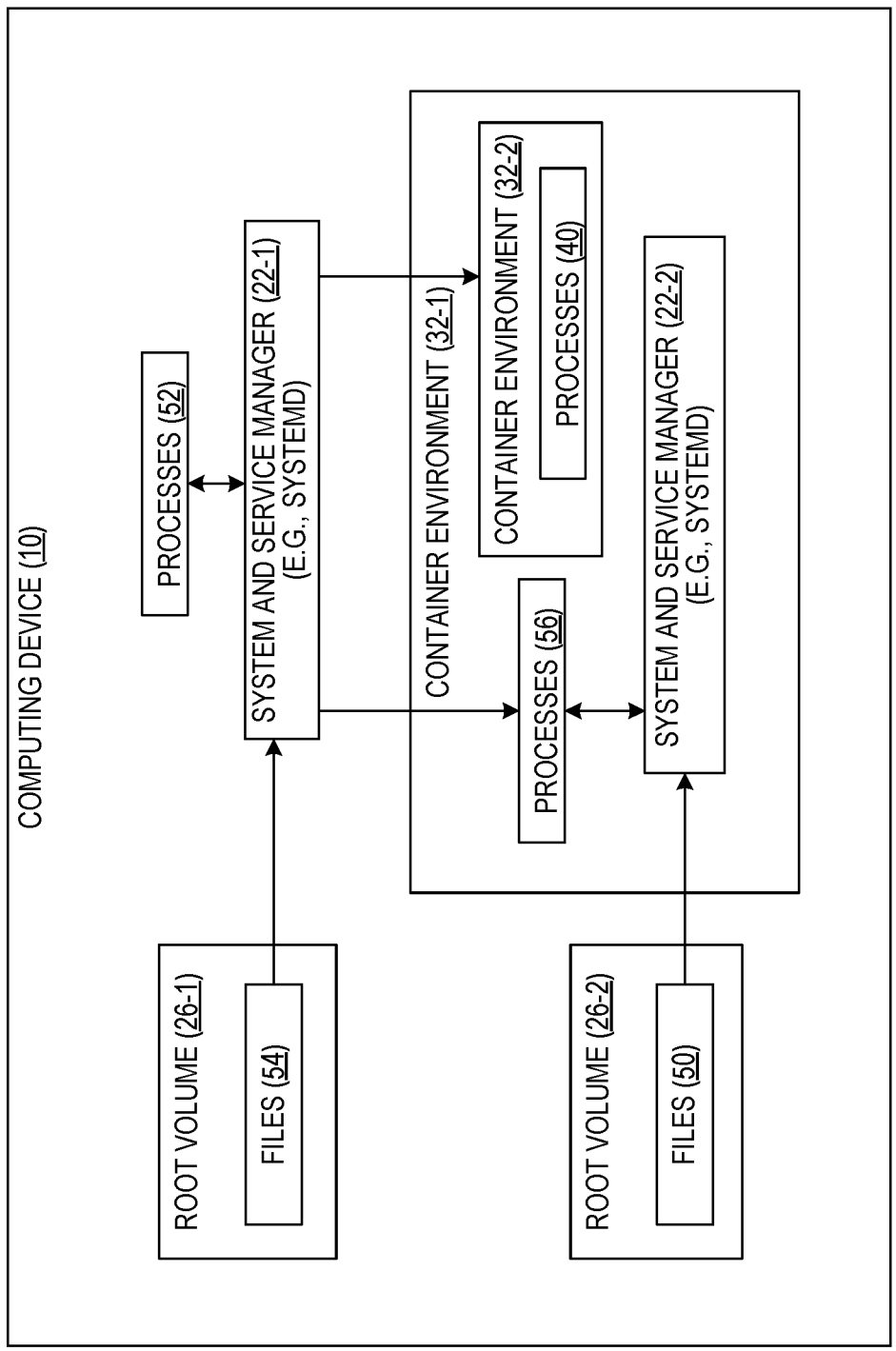
FIG. 5 is a block diagram of the computing device of FIG. 1 for freedom from interference using containers, according to one example.

FIG. 5 is a block diagram of the computing device of FIG. 1 for freedom from interference using containers, according to one example. Elements of FIG. 1 are referenced in describing FIG. 5 for the sake of clarity. In the example of FIG. 5, the second system and service manager 22-2 can obtain the processes 40 running inside the first restricted container environment 32-1. The second system and service manager 22-2 can also obtain files 50 stored on the second root volume 26-2. The second system and service manager 22-2 cannot obtain processes 52 running in locations outside the first restricted container environment 32-1. For instance, the second system and service manager 22-2 cannot obtain processes running in the host environment 38, the third restricted container environment 32-3, or in the system memory 12 outside the first restricted container environment 32-1. The second system and service manager 22-2 also cannot obtain files 54 stored on the first root volume 26-1. As a result, the locations outside the first restricted container environment 32-1 are free from interference from processes 40 running inside the first restricted container environment 32-1 since the second system and service manager 22-2 cannot obtain the processes 52 running in locations outside the first restricted container environment 32-1. For example, the first restricted container environment 32-1 may contain less critical or QM level applications (e.g., processes 56, processes 40) and locations outside the first restricted container environment 32-1 may contain ASIL applications (e.g., processes 52), so the QM level applications cannot interfere with the ASIL applications.

In the example of FIG. 5, the first system and service manager 22-1 can obtain processes 56 running inside the first restricted container environment 32-1. The first system and service manager 22-1 can also obtain containers running inside the first restricted container environment 32-1, such as the second restricted container environment 32-2, which may include obtaining the processes executing inside the containers, such as the processes 40 running inside the second restricted container environment 32-2. The first system and service manager 22-1 can also obtain processes running in locations outside the first restricted container environment 32-1, such as the processes 52. For example, the processes 52 running outside the first restricted container environment 32-1 may be critical or ASIL applications and the processes 56 running inside the first restricted container environment 32-1 and the processes 40 running inside the second restricted container environment 32-2 may be less critical or QM level applications. The first system and service manager 22-1 can identify and obtain the processes and QM level applications inside the first restricted container environment 32-1 and the second restricted container environment 32-2, which allows the first system and service manager 22-1 to reallocate computing resources or pause or terminate QM level applications that have the potential to interfere with the ASIL applications. The second system and service manager 22-2 is still unable to identify or obtain the processes outside the first restricted container environment 32-1, so freedom from interference can still be achieved.

Figure 6:
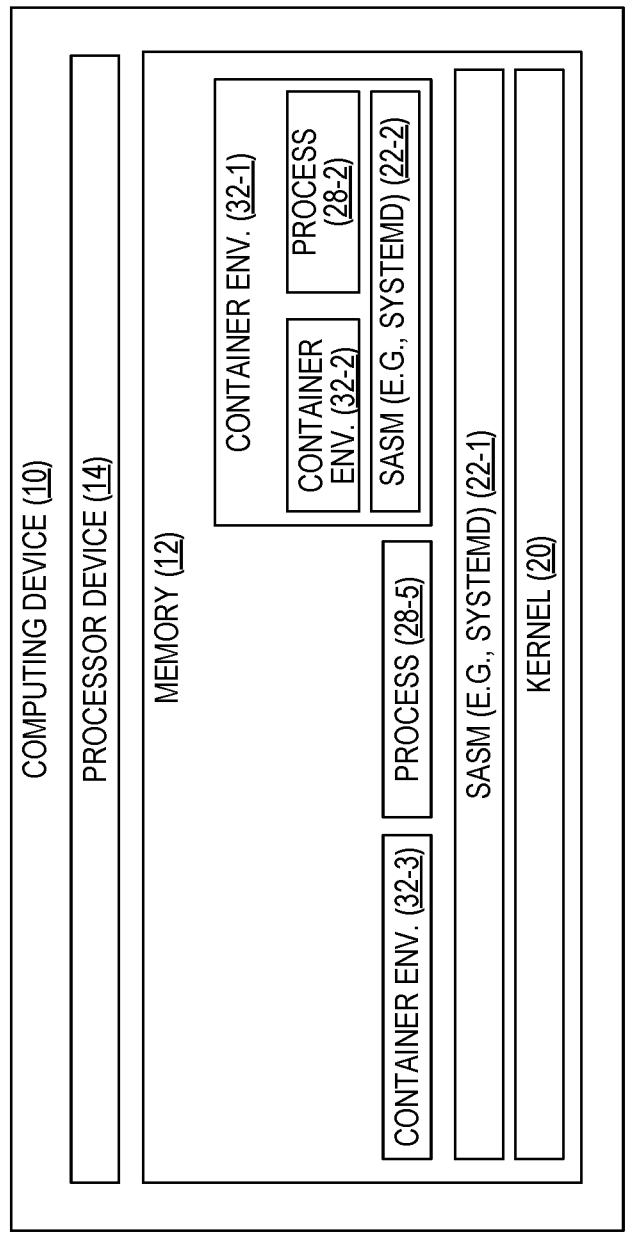
FIG. 6 is a block diagram of the computing device of FIG. 1 for freedom from interference using containers, according to one example.

FIG. 6 is a block diagram of the computing device of FIG. 1 for freedom from interference using containers, according to one example. Elements of FIG. 1 are referenced in describing FIG. 6 for the sake of clarity. In the example of FIG. 6, the computing device 10 may comprise the processor device 14 and the system memory 12. The system memory 12 may contain the kernel-based operating system 18, the kernel 20, the first system and service manager 22-1, the first restricted container environment 32-1, the third restricted container environment 32-3, and the process 28-5. The first restricted container environment 32-1 may contain the second system and service manager 22-2, the second restricted container environment 32-2, and the process 28-2. As a result, the third restricted container environment 32-3 and the process 28-5 are free from interference from the first restricted container environment 32-1 and the process 28-2 and the second restricted container environment 32-2 that are running inside the first restricted container environment 32-1. For example, the process 28-5 may be an ASIL application or a process that runs the ASIL application and the third restricted container environment 32-3 may be a container that can run another ASIL application. The process 28-2 in the first restricted container environment 32-1 may be a QM level application or a process that runs the QM level application and the second restricted container environment 32-2 may be a container that can run another QM level application. As a result, the QM level application (e.g., process 28-2, second restricted container environment 32-2) cannot interfere with the ASIL application (e.g., process 28-5, third restricted container environment 32-3). The resulting freedom from interference can be achieved while the first restricted container environment 32-1 can share the kernel 20 of the kernel-based operating system 18 with the process 28-5 and the third restricted container environment 32-3 outside the first restricted container environment 32-1. As a result of sharing the kernel 20, freedom from interference (e.g., first restricted container environment 32-1, second restricted container environment 32-2, process 28-2 cannot interfere with third restricted container environment 32-3, process 28-5) may be achieved while being lightweight and allowing for increased performance of the computing device 10.

Figure 7:
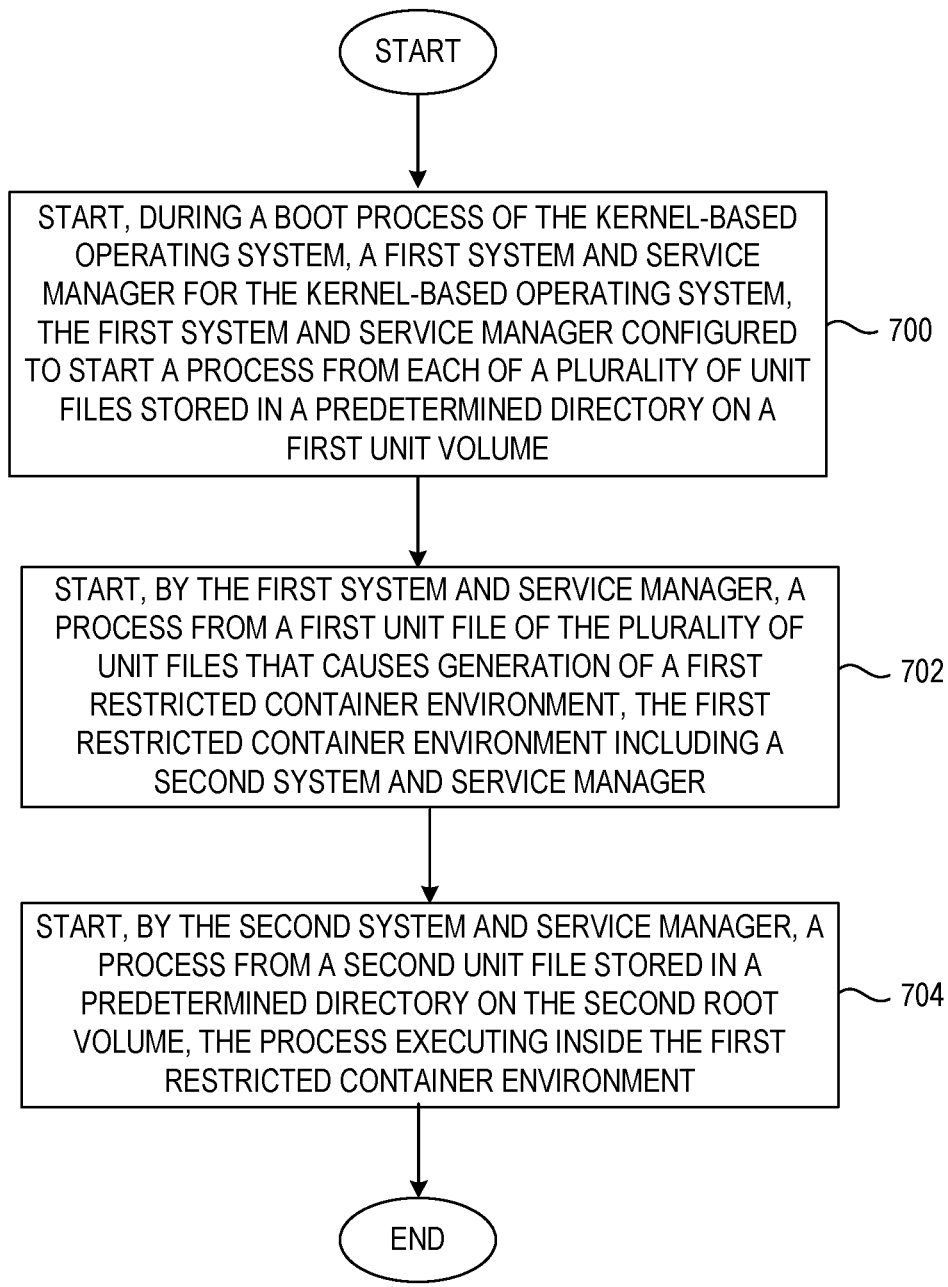
FIG. 7 is a flowchart illustrating operations performed by the computing device of FIG. 1 for freedom from interference using containers, according to one example.

FIG. 7 is a flowchart illustrating operations performed by the computing device of FIG. 1 for freedom from interference using containers, according to one example. Elements of FIG. 1 are referenced in describing FIG. 7 for the sake of clarity. In FIG. 7, operations begin with a processor device of an engine control unit (ECU) executing a kernel-based operating system in an automobile, such as the processor device 14 of the computing device 10 of FIG. 1, starting, during a boot process of the kernel-based operating system, a first system and service manager for the kernel-based operating system, the first system and service manager configured to start a process from each of a plurality of unit files stored in a predetermined directory on a first root volume (block 700). The processor device 14 then starts, by the first system and service manager, a process from a first unit file of the plurality of unit files that causes generation of a first restricted container environment, wherein a second root volume is mounted to the first restricted container environment, the first restricted container environment including a second system and service manager (block 702). The processor device 14 then starts, by the second system and service manager, a process from a second unit file stored in a predetermined directory on the second root volume, the process executing inside the first restricted container environment (block 704).

Figure 8:
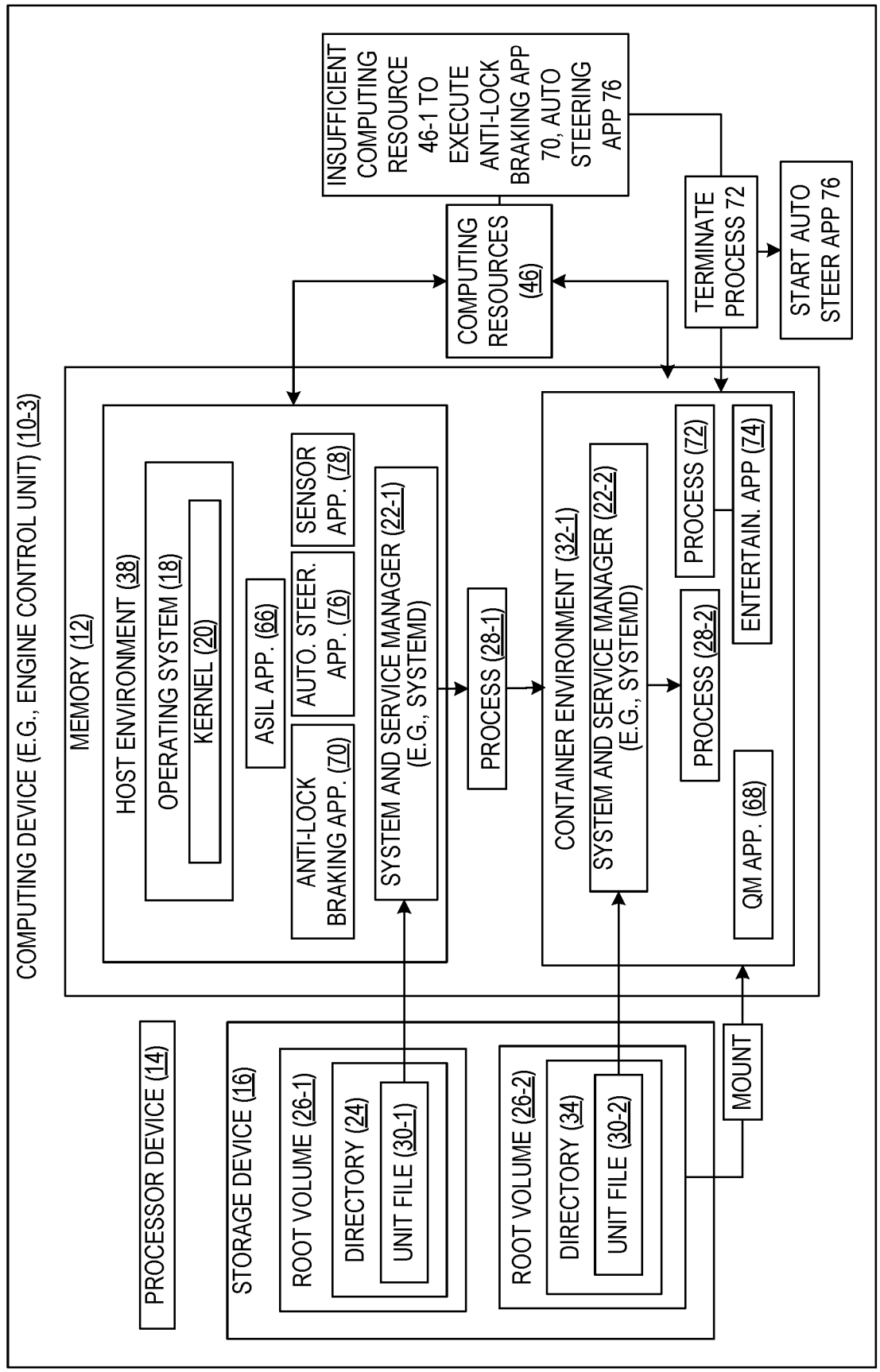
FIG. 8 is a block diagram of the computing device of FIG. 1 for freedom from interference using containers, according to one example.

FIG. 8 is a block diagram of the computing device of FIG. 1 for freedom from interference using containers, according to one example. Elements of FIG. 1 are referenced in describing FIG. 8 for the sake of clarity. In the example of FIG. 8, ECU 10-3 in the automobile may start, during a boot process of the kernel-based operating system 18 of the ECU 10-3, the first system and service manager 22-1 for the kernel-based operating system 18. The first system and service manager 22-1 may be systemd, such as in implementations where the kernel-based operating system 18 of the ECU 10-3 is based on the Linux operating system. The first system and service manager 22-1 can start a process from a unit file and the unit files can be stored in the predetermined directory 24 on the first root volume 26-1 of the ECU 10-3. The first root volume 26-1 can be in the storage device 16 of the ECU 10-3. The first system and service manager 22-1 can start the process 28-1 from the first unit file 30-1 to cause the generation of the first restricted container environment 32-1. For example, the first unit file 30-1 may have Podman commands to initialize and start a container (e.g., first restricted container environment 32-1). The second root volume 26-2 can be mounted to the first restricted container environment 32-1. The second root volume 26-2 can be in the storage device 16 of the ECU 10-3. The first restricted container environment 32-1 can include the second system and service manager 22-2, which can be systemd in implementations where the kernel-based operating system 18 of the ECU 10-3 is based on the Linux operating system. The second system and service manager 22-2 can start the process 28-2 from the second unit file 30-2 stored in the predetermined directory 34 on the second root volume 26-2. The process 28-2 can execute inside the first restricted container environment 32-1.

As a result, processes running inside the first restricted container environment 32-1 are isolated from processes running outside the first restricted container environment 32-1, thus processes running on the ECU 10-3 outside the first restricted container environment 32-1 can be free from interference from processes running inside the first restricted container environment 32-1. For instance, the first restricted container environment 32-1 can execute QM level applications, while ASIL applications can be executed outside the first restricted container environment 32-1, allowing for the ASIL applications to be free from interference from the QM level applications. The host environment 38 can run on the ECU 10-3, can be external to the first restricted container environment 32-1, and can include ASIL applications 66, while the first restricted container environment can include QM level applications 68. Freedom from interference can be achieved since the QM level applications 68 are in the first restricted container environment 32-1 with the second system and service manager 22-2 and use the second root volume 26-2, so the QM level applications 68 cannot interfere with the ASIL applications 66 in the host environment 38 with the first system and service manager 22-1.

For example, the ECU 10-3 can determine that a process corresponding to an anti-lock braking application 70 is going to be started and that the ECU 10-3 has an insufficient amount of a computing resource (e.g., computing resource 46-1 from among the computing resources 46) to execute the process corresponding to the anti-lock braking application 70. The anti-lock braking application 70 can be in an environment that is external to the first restricted container environment, such as in the host environment 38. The ECU 10-3 can determine that terminating a process 72 that is running in the first restricted container environment 32-1 would result in a sufficient amount of the computing resource to be able to execute the process corresponding to the anti-lock braking application 70. The process 72 may correspond to a QM level application, such as an entertainment application 74. The ECU 10-3 can then cause the process 72 in the first restricted container environment 32-1 to be terminated. For instance, the ECU 10-3 or the first system and service manager 22-1 can send a message or instruction to the second system and service manager 22-2 or the kernel 20 to terminate the process 72. For example, the ECU 10-3 may determine that the anti-lock braking application 70 processes do not have enough memory to execute and that terminating the entertainment application 74 in the first restricted container environment 32-1 can provide sufficient memory for the anti-lock braking application 70 to execute, then pause the entertainment application 74.

In another example, the ECU 10-3 can determine that a process corresponding to an automatic steering application 76 is going to be started and that the ECU 10-3 has an insufficient amount of a computing resource (e.g., computing resource 46-1 from among the computing resources 46) to execute the process corresponding to the automatic steering application 76. The automatic steering application 76 can be in an environment that is external to the first restricted container environment 32-1, such as in the host environment 38. The ECU 10-3 can determine that terminating a process 72 that is running in the first restricted container environment 32-1 would result in a sufficient amount of the computing resource to be able to execute the process corresponding to the automatic steering application 76. The process 72 may correspond to a QM level application, such as the entertainment application 74. The ECU 10-3 can then cause the process 72 (e.g., entertainment application 74) in the first restricted container environment 32-1 to be terminated. For instance, the ECU 10-3 or the first system and service manager 22-1 can send a message or instruction to the second system and service manager 22-2 or the kernel 20 to terminate the process 72. The ECU 10-3 can then start the process that corresponds to the automatic steering application 76. After starting the process that corresponds to the automatic steering application 76, the ECU 10-3 may determine that there is an obstacle in the path of the automobile with the ECU 10-3, such as by a sensor application 78 executing in the ECU 10-3. The sensor application 78 may be an ASIL application and may be in an environment outside the first restricted container environment 32-1, such as in the host environment 38. In response to determining that there is an obstacle in the path of the automobile, the ECU 10-3 can cause a steering device of the automobile to steer around the obstacle.

Figure 9:
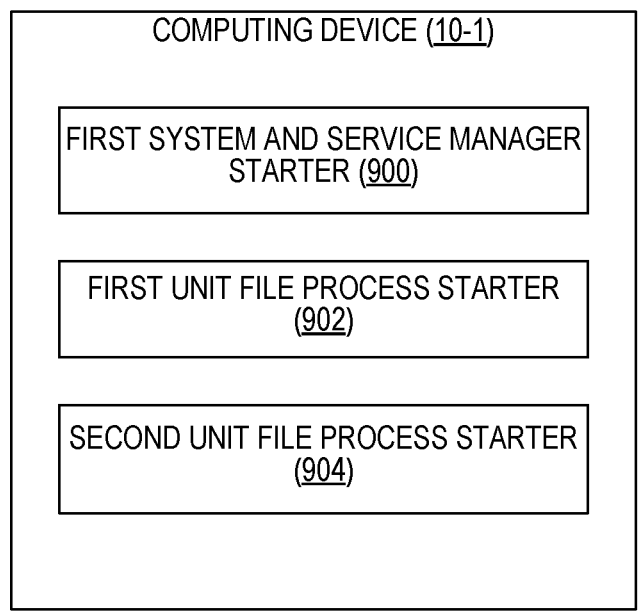
FIG. 9 is a block diagram of a computing device suitable for implementing aspects illustrated in FIGS. 1-6 according to one example.

FIG. 9 is a block diagram of a computing device 10-1 suitable for implementing aspects illustrated in FIGS. 1-6 according to one example. The computing device 10-1 implements identical functionality as that described above with regard to the computing device 10. The computing device 10-1 includes a first system and service manager starter 900 to start, during a boot process of the kernel-based operating system, a first system and service manager for the kernel-based operating system, the first system and service manager configured to start a process from each of a plurality of unit files stored in a predetermined directory on a first root volume. The first system and service manager starter 900 may comprise executable software instructions configured to program a processor device to implement the functionality of starting, during a boot process of the kernel-based operating system, a first system and service manager for the kernel-based operating system, the first system and service manager configured to start a process from each of a plurality of unit files stored in a predetermined directory on a first root volume, may comprise circuitry including, by way of non-limiting example, an application-specific integrated circuit (ASIC), field-programmable gate array (FPGA), or may comprise a combination of executable software instructions and circuitry.

The computing device 10-1 also includes a first unit file process starter 902 to start, by the first system and service manager, a process from a first unit file of the plurality of unit files that causes generation of a first restricted container environment, wherein a second root volume is mounted to the first restricted container environment, the first restricted container environment including a second system and service manager. The first unit file process starter 902 may comprise executable software instructions configured to program a processor device to implement the functionality of starting, by the first system and service manager, a process from a first unit file of the plurality of unit files that causes generation of a first restricted container environment, wherein a second root volume is mounted to the first restricted container environment, the first restricted container environment including a second system and service manager, may comprise circuitry including, by way of non-limiting example, an ASIC, FPGA, or may comprise a combination of executable software instructions and circuitry.

The computing device 10-1 also includes a second unit file process starter 904 to start, by the second system and service manager, a process from a second unit file stored in a predetermined directory on the second root volume, the process executing inside the first restricted container environment. In some implementations, the second unit file process starter 904 starts, by the second system and service manager, the process from the second unit file stored in the predetermined directory on the second root volume, by instructing, by the first system and service manager, the second system and service manager to start the process from the second unit file inside the first restricted container environment. The second unit file process starter 904 may comprise executable software instructions configured to program a processor device to implement the functionality of starting, by the second system and service manager, a process from a second unit file stored in a predetermined directory on the second root volume, the process executing inside the first restricted container environment, may comprise circuitry including, by way of non-limiting example, an ASIC, FPGA, or may comprise a combination of executable software instructions and circuitry.

Figure 10:
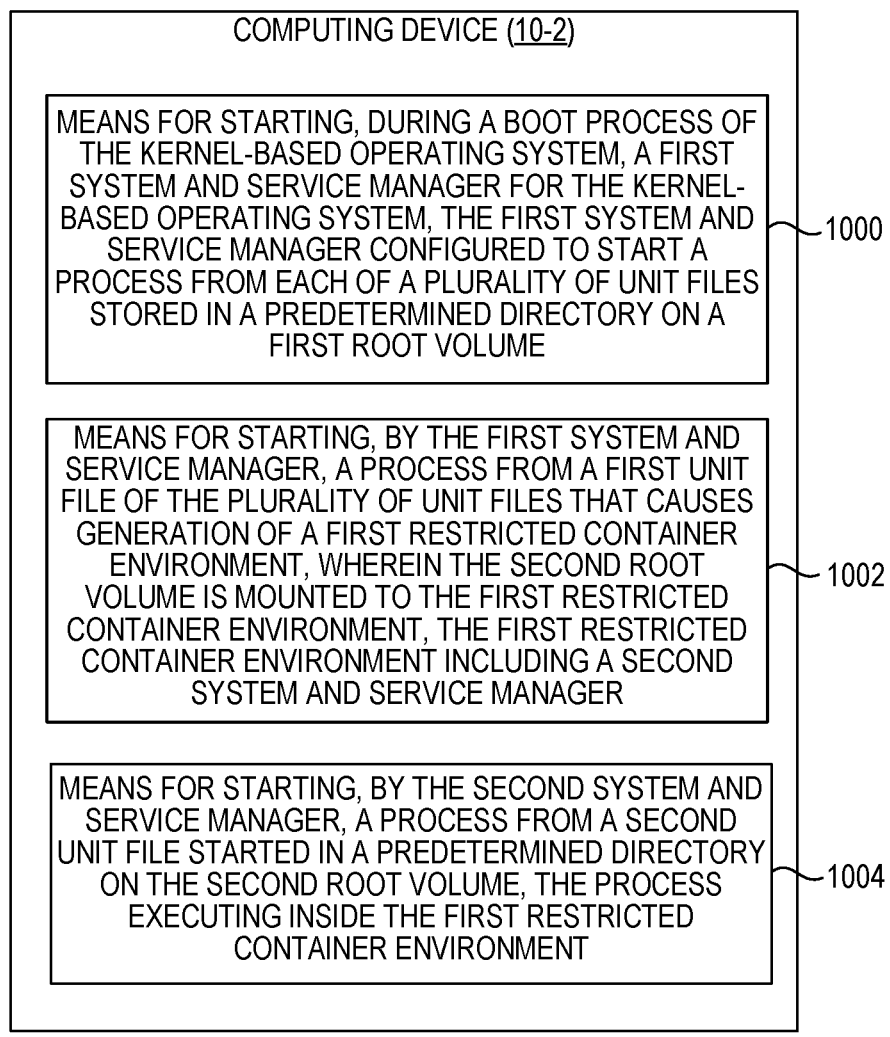
FIG. 10 is a block diagram of the computing device of FIG. 1 for freedom from interference using containers, according to one example.

FIG. 10 is a block diagram of a computing device 10-2 according to additional implementations. The computing device 10-2 implements identical functionality as that described above with regard to the computing device 10. In this implementation, the computing device 10-2 includes a means 1000 for starting, during a boot process of the kernel-based operating system, a first system and service manager for the kernel-based operating system, the first system and service manager configured to start a process from each of a plurality of unit files stored in a predetermined directory on a first root volume. The means 1000 may be implemented in any number of manners, including, for example via the first system and service manager starter 900 illustrated in FIG. 9.

The computing device 10-2 also includes a means 1002 for starting, by the first system and service manager, a process from a first unit file of the plurality of unit files that causes generation of a first restricted container environment, wherein a second root volume is mounted to the first restricted container environment, the first restricted container environment including a second system and service manager. The means 1002 may be implemented in any number of manners, including, for example via the first unit file process starter 902 illustrated in FIG. 8.

The computing device 10-2 also includes a means 1004 for starting, by the second system and service manager, a process from a second unit file stored in a predetermined directory on the second root volume, the process executing inside the first restricted container environment. The means 1004 may, in some implementations, instruct, by the first system and service manager, the second system and service manager to start the process from the second unit file inside the first restricted container environment. The means 1004 may be implemented in any number of manners, including, for example via the second unit file process starter 904 illustrated in FIG. 8.

Figure 11:
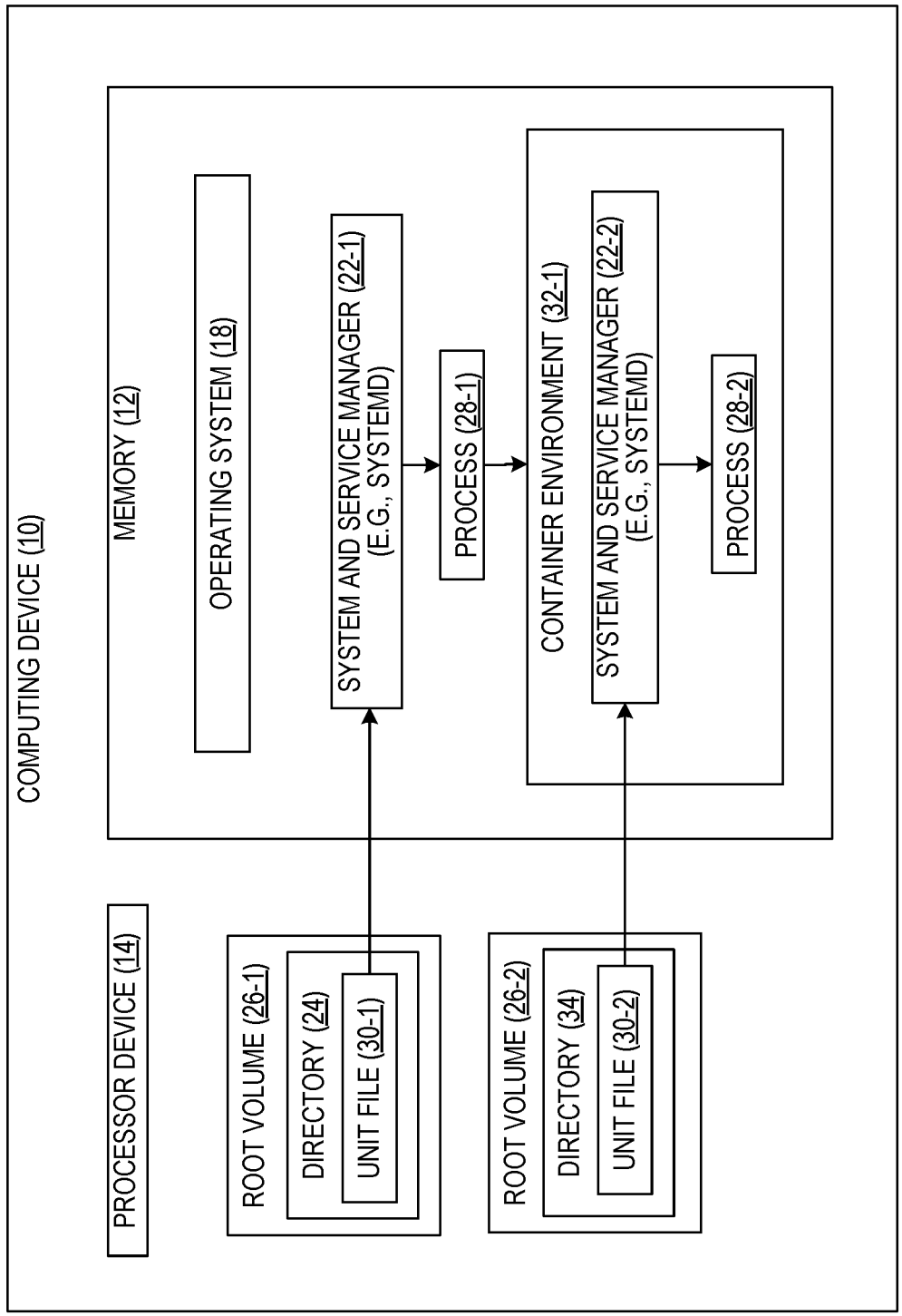
FIG. 11 is a block diagram of the computing device of FIG. 1 for freedom from interference using containers, according to one example.

FIG. 11 is a block diagram of the computing device of FIG. 1 for freedom from interference using containers, according to one example. Elements of FIG. 1 are referenced in describing FIG. 11 for the sake of clarity. In the example of FIG. 11, the computing device 10 executes the kernel-based operating system 18 and includes a system memory 12 and a processor device 14 coupled to the system memory 12. The processor device 14 is to start, during a boot process of the kernel-based operating system 18, a first system and service manager 22-1 for the kernel-based operating system 18, the first system and service manager 22-1 configured to start a process from each of a plurality of unit files stored in a predetermined directory 24 on a first root volume 26-1. The processor device 14 is further to start, by the first system and service manager 22-1, a process 28-1 from a first unit file 30-1 of the plurality of unit files that causes generation of a first restricted container environment 32-1, wherein a second root volume 26-2 is mounted to the first restricted container environment 32-1, the first restricted container environment 32-1 including a second system and service manager 22-2. The processor device 14 is further to start, by the second system and service manager 22-2, a process 28-2 from a second unit file 30-2 stored in a predetermined directory 34 on the second root volume 26-2, the process 28-2 executing inside the first restricted container environment 32-1.

Figure 12:
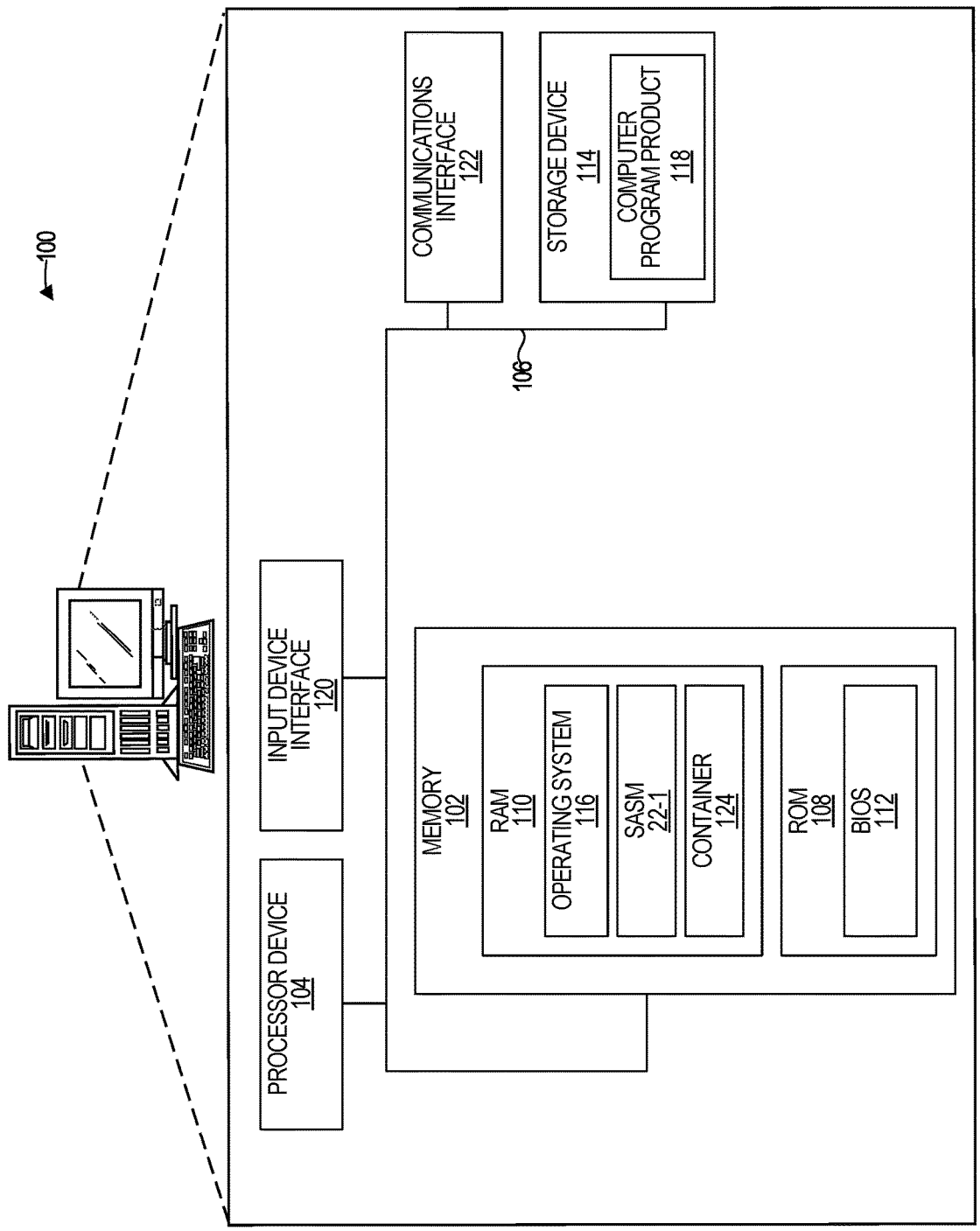
FIG. 12 is a block diagram of a computing device suitable for implementing examples, according to one example.

FIG. 12 is a block diagram of a computing device 100, such as the computing device 10 of FIG. 1, suitable for implementing examples according to one example. The computing device 100 may comprise any computing or electronic device capable of including firmware, hardware, and/or executing software instructions to implement the functionality described herein. The computing device 100 includes system memory 102, such as the system memory, processor device 104, such as the processor device 14, and a system bus 106. The system bus 106 provides an interface for system components including, but not limited to, the system memory 102 and the processor device 104. The processor device 104 can be any commercially available or proprietary processor.

The system bus 106 may be any of several types of bus structures that may further interconnect to a memory bus (with or without a memory controller), a peripheral bus, and/or a local bus using any of a variety of commercially available bus architectures. The system memory 102 may include non-volatile memory 108 (e.g., read-only memory (ROM), erasable programmable read-only memory (EPROM), electrically erasable programmable read-only memory (EEPROM), etc.), and volatile memory 110 (e.g., random-access memory (RAM)). A basic input/output system (BIOS) 112 may be stored in the non-volatile memory 108 and can include the basic routines that help to transfer information between elements within the computing device 100. The volatile memory 110 may also include a high-speed RAM, such as static RAM, for caching data.

The computing device 100 may further include or be coupled to a non-transitory computer-readable storage medium, such as storage device 114 (e.g., the storage device 16), which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 114 and other drives associated with computer-readable media and computer-usable media may provide non-volatile storage of data, data structures, computer-executable instructions, and the like.

A number of modules can be stored in the storage device 114 and in the volatile memory 110, including an operating system 116, one or more program modules, such as the first system and service manager 22-1, which may implement the functionality described herein in whole or in part, and one or more containers, such as a container 124 or the first restricted container environment 32-1. All or a portion of the examples may be implemented as a computer program product 118 stored on a transitory or non-transitory computer-usable or computer-readable storage medium, such as the storage device 114, which includes complex programming instructions, such as complex computer-readable program code, to cause the processor device 104 to carry out the steps described herein. Thus, the computer-readable program code can comprise software instructions for implementing the functionality of the examples described herein when executed on the processor device 104. The processor device 104, in conjunction with the first system and service manager 22-1 in the volatile memory 110, may serve as a controller, or control system, for the computing device 100 that is to implement the functionality described herein.

An operator, such as a user, may also be able to enter one or more configuration commands through a keyboard (not illustrated), a pointing device such as a mouse (not illustrated), or a touch-sensitive surface such as a display device (not illustrated). Such input devices may be connected to the processor device 14 through an input device interface 120 that is coupled to the system bus 106 but can be connected by other interfaces such as a parallel port, an Institute of Electrical and Electronic Engineers (IEEE) 1394 serial port, a Universal Serial Bus (USB) port, an IR interface, and the like. The computing device 100 may also include a communications interface 122 suitable for communicating with the network as appropriate or desired. The computing device 100 may also include a video port (not illustrated) configured to interface with the display device (not illustrated), to provide information to the user.

Other computer system designs and configurations may also be suitable to implement the systems and methods described herein. The following examples illustrate various implementations in accordance with one or more aspects of the disclosure.

Example 1 is a method comprising starting, by an engine control unit (ECU) executing a kernel-based operating system in an automobile during a boot process of the kernel-based operating system, a first system and service manager for the kernel-based operating system, the first system and service manager configured to start a process from each of a plurality of unit files stored in a predetermined directory on a first root volume; starting, by the first system and service manager, a process from a first unit file of the plurality of unit files that causes generation of a first restricted container environment, wherein a second root volume is mounted to the first restricted container environment, the first restricted container environment including a second system and service manager; and starting, by the second system and service manager, a process from a second unit file stored in a predetermined directory on the second root volume, the process executing inside the first restricted container environment.

Example 2 is the method of example 1, further comprising a host environment that is external to the first restricted container environment, wherein the first restricted container environment includes Quality Management level applications and the host environment runs on the ECU and includes Automotive Safety Integrity Level applications.

Example 3 is the method of example 1, further comprising: determining, by the ECU, that a process corresponding to an anti-lock braking application is to be started; determining, by the ECU, that the ECU has an insufficient amount of a computing resource to execute the process corresponding to the anti-lock braking application; determining, by the ECU, that terminating a process in the first restricted container environment would result in a sufficient amount of the computing resource to execute the process corresponding to the anti-lock braking application; and causing, by the ECU, the process in the first restricted container environment to be terminated.

Example 4 is the method of example 3, wherein the process in the first restricted container environment comprises an entertainment application.

Example 5 is the method of example 3, wherein the process corresponding to the anti-lock braking application is in an environment that is external to the first restricted container environment.

Example 6 is the method of example 1, further comprising: determining, by the ECU, that a process corresponding to an automatic steering application is to be started; determining, by the ECU, that the ECU has an insufficient amount of a computing resource to execute the process corresponding to the automatic steering application; determining, by the ECU, that terminating a process in the first restricted container environment would result in a sufficient amount of the computing resource to execute the process corresponding to the automatic steering application; causing, by the ECU, the process in the first restricted container environment to be terminated; and starting, by the ECU, the process corresponding to the automatic steering application.

Example 7 is the method of example 6, further comprising: subsequent to starting, by the ECU, the process corresponding to the automatic steering application, determining, by a sensor application executing in the ECU, that there is an obstacle in a path of the automobile; and in response to determining, by the sensor application executing in the ECU, that there is an obstacle in a path of the automobile, causing, by the ECU, a steering device of the automobile to steer the automobile around the obstacle.

Example 8 is an engine control unit (ECU) executing a kernel-based operating system that includes a memory and a processor device coupled to the memory. The processor device is to start, during a boot process of the kernel-based operating system, a first system and service manager for the kernel-based operating system, the first system and service manager configured to start a process from each of a plurality of unit files stored in a predetermined directory on a first root volume; start, by the first system and service manager, a process from a first unit file of the plurality of unit files that causes generation of a first restricted container environment, wherein a second root volume is mounted to the first restricted container environment, the first restricted container environment including a second system and service manager; and start, by the second system and service manager, a process from a second unit file stored in a predetermined directory on the second root volume, the process executing inside the first restricted container environment.

Example 9 is the computing device of example 8, further comprising a host environment that is external to the first restricted container environment, wherein the first restricted container environment includes Quality Management level applications and the host environment runs on the ECU and includes Automotive Safety Integrity Level applications.

Example 10 is the computing device of example 8, wherein the processor device is further to: determine that a process corresponding to an anti-lock braking application is to be started; determine that the ECU has an insufficient amount of a computing resource to execute the process corresponding to the anti-lock braking application; determine that terminating a process in the first restricted container environment would result in a sufficient amount of the computing resource to execute the process corresponding to the anti-lock braking application; and cause the process in the first restricted container environment to be terminated.

Example 11 is the computing device of example 10, wherein the process corresponding to the anti-lock braking application is in an environment that is external to the first restricted container environment.

Example 12 is the computing device of example 8, wherein the processor device is further to: determine that a process corresponding to an automatic steering application is to be started; determine that the ECU has an insufficient amount of a computing resource to execute the process corresponding to the automatic steering application; determine that terminating a process in the first restricted container environment would result in a sufficient amount of the computing resource to execute the process corresponding to the automatic steering application; cause the process in the first restricted container environment to be terminated; and start the process corresponding to the automatic steering application.

Example 13 is the computing device of example 12, wherein the processor device is further to: subsequent to start the process corresponding to the automatic steering application, determine, by a sensor application, that there is an obstacle in a path of the automobile; and in response to determine, by the sensor application, that there is an obstacle in a path of the automobile, cause a steering device of the automobile to steer the automobile around the obstacle.

Example 14 is a non-transitory computer-readable storage medium that includes computer-executable instructions that, when executed, cause one or more processor devices to start, during a boot process of the kernel-based operating system, a first system and service manager for the kernel-based operating system, the first system and service manager configured to start a process from each of a plurality of unit files stored in a predetermined directory on a first root volume; start, by the first system and service manager, a process from a first unit file of the plurality of unit files that causes generation of a first restricted container environment, wherein a second root volume is mounted to the first restricted container environment, the first restricted container environment including a second system and service manager; and start, by the second system and service manager, a process from a second unit file stored in a predetermined directory on the second root volume, the process executing inside the first restricted container environment.

Example 15 is the non-transitory computer-readable storage medium of example 14, further comprising a host environment that is external to the first restricted container environment, wherein the first restricted container environment includes Quality Management level applications and the host environment runs on the ECU and includes Automotive Safety Integrity Level applications.

Example 16 is the non-transitory computer-readable storage medium of example 14, wherein the instructions are further to cause the processor device to: determine that a process corresponding to an anti-lock braking application is to be started; determine that the ECU has an insufficient amount of a computing resource to execute the process corresponding to the anti-lock braking application; determine that terminating a process in the first restricted container environment would result in a sufficient amount of the computing resource to execute the process corresponding to the anti-lock braking application; and cause the process in the first restricted container environment to be terminated.

Example 17 is the non-transitory computer-readable storage medium of example 14, wherein the instructions are further to cause the processor device to: determine that a process corresponding to an automatic steering application is to be started; determine that the ECU has an insufficient amount of a computing resource to execute the process corresponding to the automatic steering application; determine that terminating a process in the first restricted container environment would result in a sufficient amount of the computing resource to execute the process corresponding to the automatic steering application; cause the process in the first restricted container environment to be terminated; and start the process corresponding to the automatic steering application.

Example 18 is the non-transitory computer-readable storage medium of example 17, wherein the instructions are further to cause the processor device to: subsequent to start the process corresponding to the automatic steering application, determine, by a sensor application, that there is an obstacle in a path of the automobile; and in response to determine, by the sensor application, that there is an obstacle in a path of the automobile, cause a steering device of the automobile to steer the automobile around the obstacle.

Individuals will recognize improvements and modifications to the preferred examples of the disclosure. All such improvements and modifications are considered within the scope of the concepts disclosed herein and the claims that follow.

What is claimed is:

1. A method, comprising:
    starting, by a computing device executing a kernel-based operating system during a boot process of the kernel-based operating system, a first system and service manager for the kernel-based operating system, the first system and service manager configured to start a process from each of a plurality of unit files stored in a predetermined directory on a first root volume;
    starting, by the first system and service manager, a process from a first unit file of the plurality of unit files that causes generation of a first restricted container environment, wherein a second root volume is mounted to the first restricted container environment, the first restricted container environment including a second system and service manager; and
    starting, by the second system and service manager, a process from a second unit file stored in a predetermined directory on the second root volume, the process from the second unit file executing inside the first restricted container environment.

2. The method of claim 1, further comprising:
    starting, by the second system and service manager, a process from a third unit file stored in the predetermined directory on the second root volume that causes generation of a second restricted container environment inside the first restricted container environment; and starting, by the second system and service manager, a process from a fourth unit file stored in the predetermined directory on the second root volume, the process from the fourth unit file executing inside the second restricted container environment.

3. The method of claim 2, further comprising:
subsequent to starting, by the second system and service manager, the process from the fourth unit file, starting, by the second system and service manager, processes inside the second restricted container environment, wherein the processes inside the second restricted container environment are restricted from accessing locations outside the first restricted container environment and the second restricted container environment.

4. The method of claim 2, wherein starting, by the second system and service manager, the process from the fourth unit file stored in the predetermined directory on the second root volume comprises instructing, by the first system and service manager, the second system and service manager to start the process from the fourth unit file inside the second restricted container environment.

5. The method of claim 1, further comprising:
creating, by the first system and service manager, a PID namespace in the first restricted container environment; and
starting, by the first system and service manager, the second system and service manager in the PID namespace in the first restricted container environment.

6. The method of claim 5, wherein the first system and service manager can obtain process identifiers in the PID namespace in the first restricted container environment and the second system and service manager cannot obtain process identifiers in PID namespaces outside the first restricted container environment.

7. The method of claim 1, further comprising a host environment that is external to the first restricted container environment, wherein the host environment runs on the computing device executing the kernel-based operating system.

8. The method of claim 7, further comprising:
starting, by the first system and service manager, a process from a fifth unit file stored in the predetermined directory on the first root volume that causes generation of a third restricted container environment inside the host environment; and
starting, by the first system and service manager, a process from a sixth unit file stored in the predetermined directory on the first root volume, the process from the sixth unit file executing inside the third restricted container environment.

9. The method of claim 7, further comprising:
determining, by the computing device, that there is an insufficient amount of a computing resource to execute a process in the host environment that is external to the first restricted container environment; and
in response to determining that there is the insufficient amount of the computing resource, causing, by the first system and service manager, a decrease in utilization of the computing resource by the first restricted container environment.

10. The method of claim 7, further comprising:
determining, by the computing device, that there is an insufficient amount of a computing resource to execute a process in the host environment that is external to the first restricted container environment;
in response to determining that there is the insufficient amount of the computing resource to execute the process in the host environment, causing, by the first system and service manager, a process in the first restricted container environment to be paused;
starting, by the first system and service manager, the process in the host environment;
determining, by the computing device, that the process in the host environment terminated; and
in response to determining that the process in the host environment terminated, starting, by the first system and service manager, the process in the first restricted container environment.

11. The method of claim 7, further comprising:
determining, by the computing device, that there is an insufficient amount of a computing resource to execute a process in the host environment that is external to the first restricted container environment; and
in response to determining that there is the insufficient amount of the computing resource to execute the process in the host environment, causing, by the first system and service manager, a process in the first restricted container environment to be terminated.

12. The method of claim 7, further comprising:
determining, by the computing device, that there is an insufficient amount of a computing resource to execute a process in the host environment that is external to the first restricted container environment;
in response to determining that there is the insufficient amount of the computing resource to execute the process in the host environment, causing, by the first system and service manager, a process in the first restricted container environment to be paused;
subsequent to causing the process in the first restricted container environment to be paused, determining, by the computing device, that there is the insufficient amount of the computing resource to execute the process in the host environment; and
in response to, subsequent to causing the process in the first restricted container environment to be paused, determining that there is the insufficient amount of the computing resource to execute the process in the host environment, causing, by the first system and service manager, the process in the first restricted container environment to be terminated.

13. The method of claim 7, further comprising:
determining, by the computing device, that there is an insufficient amount of a computing resource to execute a process in the host environment that is external to the first restricted container environment; and
in response to determining that there is the insufficient amount of the computing resource to execute the process in the host environment, causing, by the first system and service manager, the first restricted container environment to be paused, wherein pausing the first restricted container environment comprises pausing processes in the first restricted container environment.

14. The method of claim 1, wherein starting, by the second system and service manager, the process from the second unit file stored in the predetermined directory on the second root volume comprises instructing, by the first system and service manager, the second system and service manager to start the process from the second unit file inside the first restricted container environment.

15. The method of claim 1, wherein the second system and service manager can obtain processes running inside the first restricted container environment and files stored on the second root volume and cannot obtain processes running in locations outside the first restricted container environment and files stored on the first root volume.

16. The method of claim 1, wherein the first system and service manager can obtain processes running inside the first restricted container environment, containers running inside the first restricted container environment, and processes running in locations outside the first restricted container environment.

17. The method of claim 1, wherein the first system and service manager utilizes an executable on the first root volume and the second system and service manager utilizes an executable on the second root volume.

18. The method of claim 17, wherein the second system and service manager utilizes an executable with the same contents as an executable for the first system and service manager.

19. A computing device executing a kernel-based operating system, comprising:
- a memory; and
- a processor device coupled to the memory, the processor device to:
  - start, during a boot process of the kernel-based operating system, a first system and service manager for the kernel-based operating system, the first system and service manager configured to start a process from each of a plurality of unit files stored in a predetermined directory on a first root volume;
  - start, by the first system and service manager, a process from a first unit file of the plurality of unit files that causes generation of a first restricted container environment, wherein a second root volume is mounted to the first restricted container environment, the first restricted container environment including a second system and service manager; and
  - start, by the second system and service manager, a process from a second unit file stored in a predetermined directory on the second root volume, the process from the second unit file executing inside the first restricted container environment.

20. A non-transitory computer-readable storage medium that includes computer-executable instructions that, when executed, cause one or more processor devices to:
- start, during a boot process of a kernel-based operating system, a first system and service manager for the kernel-based operating system, the first system and service manager configured to start a process from each of a plurality of unit files stored in a predetermined directory on a first root volume;
- start, by the first system and service manager, a process from a first unit file of the plurality of unit files that causes generation of a first restricted container environment, wherein a second root volume is mounted to the first restricted container environment, the first restricted container environment including a second system and service manager; and
- start, by the second system and service manager, a process from a second unit file stored in a predetermined directory on the second root volume, the process from the second unit file executing inside the first restricted container environment.

\* \* \* \* \*